United States Patent
Katsuo et al.

(10) Patent No.: US 8,588,042 B2
(45) Date of Patent: Nov. 19, 2013

(54) RECORDING-AND-REPRODUCING APPARATUS AND CONTENT-MANAGING METHOD

(75) Inventors: Satoshi Katsuo, Tokyo (JP); Yuka Yamamoto, Tokyo (JP); Minoru Kawahara, Kanagawa (JP); Hisao Tanaka, Tokyo (JP); Noboru Oya, Kanagawa (JP); Tsutomu Shimosato, Kanagawa (JP); Motohiro Terao, Kanagawa (JP)

(73) Assignee: Sony Corporation (JP)

( * ) Notice: Subject to any disclaimer, the term of this patent is extended or adjusted under 35 U.S.C. 154(b) by 122 days.

(21) Appl. No.: 13/018,544

(22) Filed: Feb. 1, 2011

(65) Prior Publication Data

US 2011/0135275 A1 Jun. 9, 2011

Related U.S. Application Data

(63) Continuation of application No. 11/906,064, filed on Sep. 28, 2007, now Pat. No. 7,916,584.

(30) Foreign Application Priority Data

Sep. 29, 2006 (JP) ............................ P2006-269892

(51) Int. Cl.
*G11B 7/085* (2006.01)
(52) U.S. Cl.
USPC ........................ 369/30.04; 386/248
(58) Field of Classification Search
None
See application file for complete search history.

(56) References Cited

U.S. PATENT DOCUMENTS

| | | | |
|---|---|---|---|
| 4,980,818 | A | 12/1990 | Shinmura |
| 5,260,801 | A | 11/1993 | Temma et al. |
| 5,829,046 | A | 10/1998 | Tzelnic et al. |
| 6,898,160 | B2 | 5/2005 | Sawabe et al. |

(Continued)

FOREIGN PATENT DOCUMENTS

| | | |
|---|---|---|
| EP | 0 978 994 | 2/2000 |
| EP | 1632947 | 3/2006 |

(Continued)

OTHER PUBLICATIONS

Office Action from Japanese Application No. 2006-269891, dated Jun. 21, 2011.

(Continued)

*Primary Examiner* — Adam R Giesy
*Assistant Examiner* — Henok Heyi
(74) *Attorney, Agent, or Firm* — Lerner, David, Littenberg, Krumholz & Mentlik, LLP

(57) ABSTRACT

A recording-and-reproducing apparatus for managing content data recorded on a removable recording medium includes: a device configured to acquire reproduction information required for reproducing the content data; a device configured to generate a first management file for individually managing the content data; a device configured to register control information for the content data in a second management file collectively managing the content data. Further, the apparatus includes a device configured to read out the control information in the second management file recorded on the recording medium; a memory in which the control information of the second management file read out by the read-out device is expanded; a device configured to compare the control information in the second management file expanded in the memory and the content data recorded on the recording medium; and a device configured to update the control information in the second management file expanded in the memory.

17 Claims, 11 Drawing Sheets

(56) References Cited

U.S. PATENT DOCUMENTS

| | | | |
|---|---|---|---|
| 7,206,973 B2 | 4/2007 | Daftardar | |
| 7,236,684 B2 | 6/2007 | Kawakami et al. | |
| 7,383,446 B1 | 6/2008 | Hatanaka et al. | |
| 7,869,697 B2 | 1/2011 | Nagaoka et al. | |
| 2002/0018644 A1* | 2/2002 | Isobe et al. | 386/95 |
| 2002/0073110 A1* | 6/2002 | Duvillier et al. | 707/206 |
| 2002/0146075 A1 | 10/2002 | Kauffman et al. | |
| 2003/0028553 A1 | 2/2003 | Kondo | |
| 2003/0142954 A1 | 7/2003 | Kotani et al. | |
| 2003/0210898 A1 | 11/2003 | Juen et al. | |
| 2004/0056087 A1 | 3/2004 | Bonneau et al. | |
| 2004/0163123 A1 | 8/2004 | Okada et al. | |
| 2004/0172575 A1* | 9/2004 | Lo et al. | 714/6 |
| 2004/0184775 A1* | 9/2004 | Nakamura et al. | 386/69 |
| 2005/0114438 A1* | 5/2005 | Bendich et al. | 709/203 |
| 2005/0120167 A1 | 6/2005 | Oiwa et al. | |
| 2005/0122863 A1 | 6/2005 | Kudo | |
| 2005/0149579 A1* | 7/2005 | Tsubaki et al. | 707/200 |
| 2005/0237865 A1 | 10/2005 | Ando et al. | |
| 2005/0286377 A1* | 12/2005 | Fontijn | 369/53.2 |
| 2006/0013085 A1* | 1/2006 | Kelly et al. | 369/47.1 |
| 2006/0051056 A1* | 3/2006 | Furukawa et al. | 386/69 |
| 2006/0056800 A1 | 3/2006 | Shimagami et al. | |
| 2006/0112124 A1 | 5/2006 | Ando et al. | |
| 2006/0115240 A1 | 6/2006 | Takahashi et al. | |
| 2006/0126451 A1 | 6/2006 | Shinkai et al. | |
| 2006/0195486 A1 | 8/2006 | Ohno et al. | |
| 2006/0265426 A1 | 11/2006 | Chen | |
| 2007/0143328 A1* | 6/2007 | Green et al. | 707/101 |
| 2007/0255727 A1 | 11/2007 | Hirose et al. | |
| 2008/0063387 A1 | 3/2008 | Yahata et al. | |

FOREIGN PATENT DOCUMENTS

| | | |
|---|---|---|
| EP | 1653466 | 5/2006 |
| JP | 11-341434 A | 12/1999 |
| JP | 2000-021086 A | 1/2000 |
| JP | 2000182358 A | 6/2000 |
| JP | 2003-052040 A | 2/2003 |
| JP | 2003-061041 A | 2/2003 |
| JP | 2003217266 A | 7/2003 |
| JP | 2004-127426 A | 4/2004 |
| JP | 2004-328034 A | 11/2004 |
| JP | 2004-328073 A | 11/2004 |
| JP | 2005-004850 A | 1/2005 |
| JP | 2005-005915 A | 1/2005 |
| JP | 2005-236950 A | 9/2005 |
| JP | 2005-309503 A | 11/2005 |
| JP | 2005-309504 A | 11/2005 |
| JP | 2006-107580 A | 4/2006 |
| JP | 2006-127560 A | 5/2006 |
| WO | 00/28544 | 5/2000 |
| WO | 2004042724 | 5/2004 |
| WO | 2006/033279 A1 | 3/2006 |
| WO | 2006030767 A1 | 3/2006 |

OTHER PUBLICATIONS

U.S. Appl. No. 11/906,064.
U.S. Appl. No. 11/880,793.
U.S. Appl. No. 11/904,286.
U.S. Appl. No. 11/897,546.
European Search Report, EP 07 25 3866.
U.S. Appl. No. 11/906,064, filed Apr. 3, 2008.
"Synchronized Multimedia Integration Language (SMIL) 1.0 Specification" Internet Citation, Jun. 15, 1998, http://www.w3.org/tr/rec-smil>.
U.S. Appl. No. 11/880,793, filed Sep. 10, 2009.
U.S. Appl. No. 11/904,286, filed Apr. 3, 2008.
U.S. Appl. No. 11/897,546, filed Apr. 17, 2008.
European Search Report, EP 07 25 3866, Feb. 4, 2008.
Communication from European Application 07253863, mailed Sep. 25, 2009.
Office Action from Korean Application No. 10-2007-0073831, dated Aug. 28, 2013.

* cited by examiner

FIG. 6

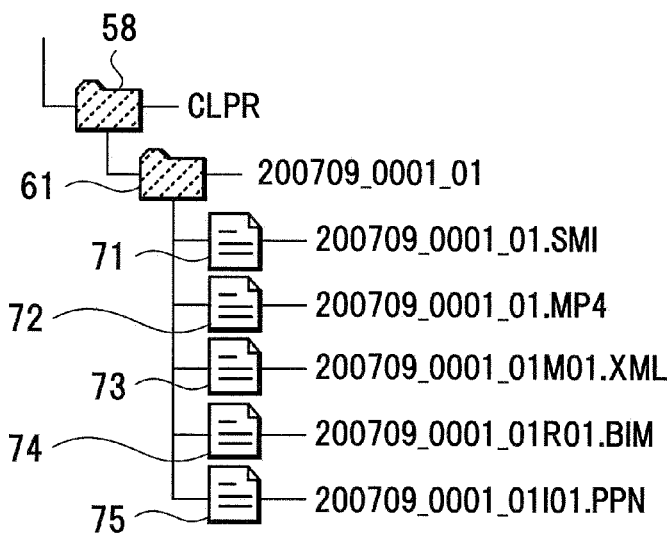

FIG. 7

```
1:  <?xml version="1.0" encoding="UTF-8"?>
2:  <MediaProfile xmlns="http://xmlns.sony.net/pro/metadata/mediaprofile"
3:    createdAt="2006-12-01T14:43:30+09:00" version="1.00">
4:    :
5:    <Contents>
6:      <Material uri="/CLPR/200709_0001_01/200709_0001_01.SMI"
7:        videoType="MPEG2HD35_1920_1080_MP@HL" audioType="LPCM16"
8:        fps="59.94i" dur="1800" ch="2" aspectRatio="16:9" offset="0"
9:        umid="060A2B3401010501010D4313...13360597080046FFFF21D90E">
10:       <Component uri="/CLPR/200709_0001_01/200709_0001_01.MP4" type="MP4"
11:         videoType="MPEG2HD35_1920_1080_MP@HL" audioType="LPCM16"
12:         fps="59.94i" dur="1800" ch="2" aspectRatio="16:9" offset="0"
13:         umid="060A2B3401010501010D4313...13360597080046FFFF21D90E"/>
14:       <RelevantInfo uri="/CLPR/200709_0001_01/200709_0001_01M01.XML"
15:         type="XML"/>
16:       <RelevantInfo uri="/CLPR/200709_0001_01/200709_0001_01R01.BIM"
17:         type="BiM"/>
18:       <RelevantInfo uri="/CLPR/200709_0001_01/200709_0001_01I01.PPN"
19:         type="PPN"/>
20:     </Material>
21:     <Material uri="/CLPR/200709_0001_02/200709_0001_02.SMI" umid="..." ... >
22:     :
23:     </Material>
24:   <Contents>
25: </MediaProfile>
```

FIG. 11

```
1:  <Contents>
2:      <Material uri="/CLPR/200709_0001_01/200709_0001_01.SMI" umid="..." ... >
3:      :
4:      </Material>
5:      <Material uri="/CLPR/200709_0002_01/200709_0002_01.SMI" umid="..." ... >
6:      :
7:      </Material>
8:      <Material uri="/CLPR/200709_0003_01/200709_0003_01.SMI" umid="..." ... >
9:          <Component uri="/CLPR/200709_0003_01/200709_0003_01.MP4" umid="..." ... />
10:         <RelevantInfo uri="/CLPR/200709_0003_01/200709_0003_01M01.XML" ... />
11:         <RelevantInfo uri="/CLPR/200709_0003_01/200709_0003_01R01.BIM" ... />
12:         <RelevantInfo uri="/CLPR/200709_0003_01/200709_0003_01I01.PPN" ... />
13:     </Material>
14:     <Material uri="/CLPR/200709_0003_02/200709_0003_02.SMI" umid="..." ... >
15:         <Component uri="/CLPR/200709_0003_02/200709_0003_02.MP4" umid="..." ... />
16:         <RelevantInfo uri="/CLPR/200709_0003_02/200709_0003_02M01.XML" ... />
17:         <RelevantInfo uri="/CLPR/200709_0003_02/200709_0003_02R01.BIM" ... />
18:         <RelevantInfo uri="/CLPR/200709_0003_02/200709_0003_02I01.PPN" ... />
19:     </Material>
20:     <Material uri="/CLPR/FUJI0004_01/FUJI0004_01.SMI" umid="..." ... >
21:     :
22:     </Material>
23: </Contents>
```

FIG. 13

```
1:   <Contents>
2:       <Material uri="/CLPR/200709_0001_01/200709_0001_01.SMI" umid="..." ... >
3:       :
4:       </Material>
5:       <Material uri="/CLPR/200709_0002_01/200709_0002_01.SMI" umid="..." ... >
6:       :
7:       </Material>
8:       <Material uri="/CLPR/200709_0003_01/200709_0003_01.SMI" umid="..." ... >
9:       <Component   uri="/CLPR/200709_0003_01/200709_0003_01.MP4" umid="..." ... />
10:      <RelevantInfo uri="/CLPR/200709_0003_01/200709_0003_01M01.XML" ... />
11:      <RelevantInfo uri="/CLPR/200709_0003_01/200709_0003_01R01.BIM" ... />
12:      <RelevantInfo uri="/CLPR/200709_0003_01/200709_0003_01I01.PPN" ... />
13:          </Matreial>
14:          <Material uri="/CLPR/200709_0003_02/200709_0003_02.SMI" umid="..." ... >
15:      <Component   uri="/CLPR/200709_0003_02/200709_0003_02.MP4" umid="..." ... />
16:      <RelevantInfo uri="/CLPR/200709_0003_02/200709_0003_02M01.XML" ... />
17:      <RelevantInfo uri="/CLPR/200709_0003_02/200709_0003_02R01.BIM" ... />
18:      <RelevantInfo uri="/CLPR/200709_0003_02/200709_0003_02I01.PPN" ... />
19:          </Material>
20:      <Material uri="/CLPR/FUJI0004_01/FUJI0004_01.SMI" umid="..." ... >
21:      :
22:          </Material>
23:      <Material uri="/CLPR/Kampake.MP4" umid="..." ... />
24:          </Material>
25:  </Contents>
```

RECORDING-AND-REPRODUCING APPARATUS AND CONTENT-MANAGING METHOD

CROSS REFERENCES TO RELATED APPLICATIONS

This application is a continuation of U.S. application Ser. No. 11/906,064, filed Sep. 28, 2007, which claims priority from Japanese Application No. JP 2006-269892 filed in the Japan Patent Office on Sep. 29, 2006, the disclosures of which are incorporated herein by reference.

BACKGROUND OF THE INVENTION

1. Field of the Invention

The present invention relates to a recording-and-reproducing apparatus and a content-managing method. Specifically, the present invention relates to a recording-and-reproducing apparatus and a content-managing method, which are suitable that, for example, a camera built-in type recording-and-reproducing apparatus or the like carry out the reproduction of a content written by another device.

2. Related Art

In recent years, recording media, such as CD-RW (Compact Disc-ReWritable) and DVD-RW (Digital Versatile Disc-ReWritable), on which data can be repetitively written or deleted, are spreading with low-pricing.

On these disk-shape recording media, data can be recorded in conformity to the Universal Disk Format (UDF). The recorded disk-shape recording medium based on UDF allows a user to randomly access the predetermined data, so that data, such as image data and audio data can be written as contents and the written contents can be deleted. In many cases, therefore, the information written on the recording media can be collectively managed in a content-management table in a content-management file, and so on.

For instance, the content-management table manages attribution information, such as information about a point to the "content" representing a position where a content is recorded, recording time and date, or a protect; a thumbnail (image) of the content, and text information about the title of the content.

Therefore, when the content recorded on the recording medium is reproduced from the recording medium, the content data is accessed according to a pointer-indicated location on the "contents" of a content-management table. The reproduction information for reproducing the content (e.g., information about the codec-type or the data-resolution of data that constitutes the content) is then obtained from the data itself or part of the data. Subsequently, the data is reproduced based on the reproduction information thus obtained.

Furthermore, the present applicant (joint applicant) proposes an information-processing device (for example, an imaging device) mounted with an optical disk drive, where data can be smoothly reproduced (see Japanese Patent Application Publication No. 2005-4850 (JP 2005-4850 A)).

Furthermore, some of removable media including recording media, such as semiconductor memories, employ a FAT (File Allocation Table) file system. The FAT file system is an example of a file system for managing the data to read and write in a personal computer (PC). A drive for a removable medium in accordance with the FAT file system can be easily incorporated in an instrument, compared with the above disk-shaped recording medium. Thus, as long as the removable medium drive is provided, the writing of data can be more easily performed by PC or the like.

The optical disk described in JP 2005-4850A uses a dedicated optical pickup device to read out the recorded data. Thus, the write of data can be performed only with an imaging apparatus mounted with an optical disk drive or with a dedicated bare drive. Therefore, the device is incorporated with a mechanism of checking whether a file can be handled, so that a workable file can be only managed before the data is really written on an optical disk.

On the other hand, in the case of a removable medium managed by the FAT file system, data can be simply written by PC or the like as long as any drive for such a removable medium is provided.

However, any concrete process for realizing the user's demands (workflows) of reproducing and confirming image data have not been proposed. In the process, any material shot by the user using an imaging device is recorded on a removable medium. The removable medium, on which image data is written, is then inserted into the slot of a PC to edit the image data. Subsequently, the image data edited by the PC is recorded on the removable medium and the removable medium is then returned to an imaging device to reproduce and confirm the image data.

It is desirable to provide an imaging device for handling a removable medium, where the imaging device is allowed to confirm data written by another equipment and control the data in reproducible state when the data is reproducible.

SUMMARY OF THE INVENTION

According to an embodiment of the present invention, the followings are enabled. A first management file is provided for individually controlling control data. On the first management file, an identifier for uniquely identifying content data is recorded together with reproduction information required for reproduction of the content data. In addition, a second management file is provided for collectively controlling content data. The second management file contains reproduction information of the content data and control information of the content data. Here, the control information of the content data includes the identifier of the content data and the information of content data for indicting the location of the content data. Both the first and second management files are used to control the content data shot by a camera unit and recorded on a removable recording medium. In this case, when the recording medium is detached from the recording-and-reproducing apparatus and then attached again thereto or when the recording-and-reproducing apparatus is powered on, the control information of the second management file is read out of the recording medium and then expanded in a memory. The control information of the second management file expanded in the memory is compared with the content data recorded on the recording medium. If the result of the comparison indicates that the control information of the second management file is not matched with the content data, the control information of the second management file expanded in the memory is updated.

According to the above configuration, the contents of the content management file in the recording medium can be matched with the actual file configuration. Thus, the user may write content data on a recording medium optionally by using an apparatus other than the recording-and-reproducing apparatus. Such content data can be automatically recognized and reproduced as contents as long as being reproducible in the recording-and-reproducing apparatus.

According to an embodiment of the present invention, a recording-and-reproducing apparatus (for example, a camera built-in type recording-and-reproducing apparatus, such as a video camera) for handing a removable recording medium can confirm data written by another apparatus. If it can be reproduced, the recording-and-reproducing apparatus controls the data in reproducible state. Therefore, for example, any recording medium, which may not be used as it is, because of the possibility of conforming to different format, can be made operational.

BRIEF DESCRIPTION OF THE DRAWINGS

FIG. 6 is a diagram that represents a configuration example of a clip directory shown in FIG. 5.

FIG. 7 is a diagram that represents a configuration example of MediaProfile shown in FIG. 5.

FIG. 11 is a diagram that represents an example of MediaProfile corresponding to the directory configuration shown in FIG. 10.

FIG. 13 is a diagram that represents MediaProfile of the removable medium added with the content file.

DETAILED DESCRIPTION

Best Mode for Carrying Out the Invention

Hereinafter, embodiments of the present invention will be described with reference to FIGS. 1 to 13.

Figure 1:
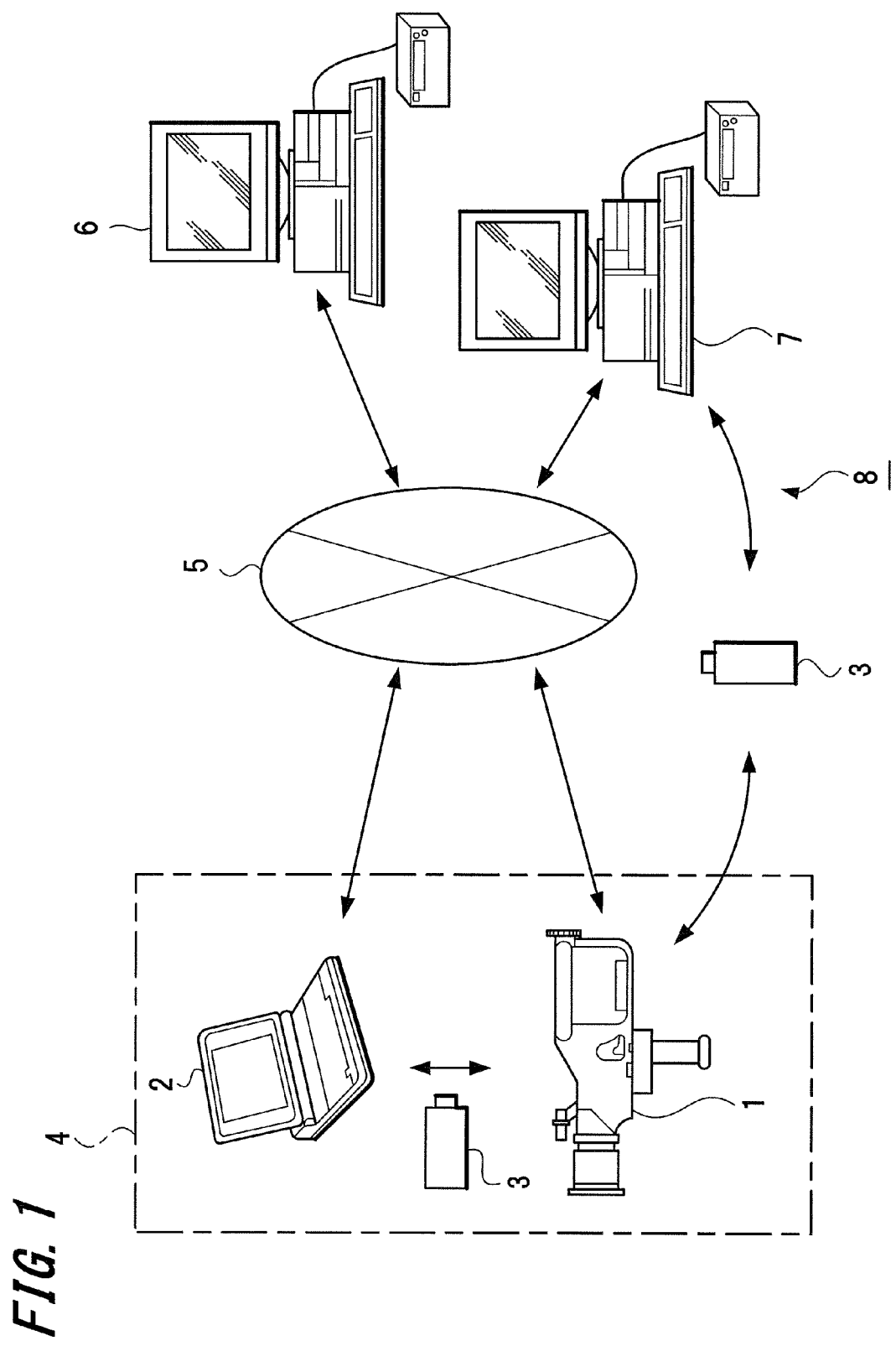
FIG. 1 is a diagram that represents a configuration example of a video-program production supporting system according to an embodiment of the present invention.

FIG. 1 illustrates an exemplified configuration of a system on which a camera built-in type recording-and-reproducing apparatus according to an embodiment of the present invention is applied.

In FIG. 1, a video-program production supporting system 8 is a system installed in a TV-broadcasting station that transmits television signals, a production company for video contents, such as videos and movies, or the like. In other words, it is a system for producing video programs, which are video works of television programs and movies. Specifically, the video-program production supporting system 8 is a system for effectively producing a video product by allowing metadata or the like added to the video program and constructed in electronic-file form to be consistently used among plural posts or stations sharing the production of the video program.

As shown in FIG. 1, the video-program production supporting system 8 includes: a planning terminal device 6, a network 5, a research terminal device 5, an editing terminal device 6, and a removable medium 3. The planning terminal device 6 is provided for carrying out planning of a video program. The network 5 is connected to the planning terminal device 6. The research terminal device 4 is connected to the network 5. The editing terminal device 7 is also connected to the network 5. The removable medium 3 is provided as a recording medium. In this case, the research terminal device 4 includes a camera built-in type recording-and-reproducing apparatus (imaging device) 1 and a field PC/PDA (Personal Computer/Personal Digital Assistant) 2 (hereinafter, referred to as a field PC 2).

The planning terminal device 6 includes, for example, an information processor, such as a personal computer, and its peripheral equipment(s). The planning terminal device 6 is installed in a planning and organization station or the like where planning of a video program is carried out. The planning and organization station controls the whole process of video-program production and carries out planning and construction of the video program to prepare the script (scenario) of the video program. In addition, the planning and organization station indicates the contents of the production works to other stations, such as a research station and an editing station. The planning terminal device 6 carries out, for example, the process of preparing the metadata of a configuration table in electronic-file form for each video program. The metadata may include the production information corresponding to the script of the video program, or the like. The planning terminal device 6 supplies the generated configuration-table metadata to the research terminal device 4 or the like through the network 5. Thus, the planning and organization station is allowed to indicate a scene and a content, which should be researched or captured, to the editing station or the like.

The research terminal device 4 is a group of terminal devices used by editing stations that carry out researches. For instance, the research terminal device 4 includes a camera built-in type recording-and-reproducing apparatus 1 and a field PC 2. The editing station is one in which the research is actually carried out at the production site in accordance with, for example, the scenario or the production instruction from the planning and organization station. The editing station takes a picture of each scene constituting a video program and researches the conditions of video-shooting.

The camera built-in type recording-and-reproducing apparatus 1 is, for example, a video camera, such as COM-CORDER®. The video camera is an apparatus used for gathering materials for a broadcast news program, shooting the scenes of a sport game or the like, and shooting a video content, such as a movie. The camera built-in type recording-and-reproducing apparatus 1 is connected to the network 5 and obtains, for example, configuration-table metadata from the aforementioned planning terminal device 6 through the network 5. Subsequently, the camera built-in type recording-and-reproducing apparatus 1 displays the acquired configuration-table metadata on a predetermined display unit, or the like to allow a camera operator or a shooting staff to recognize the content to be shot. Furthermore, the camera built-in type recording-and-reproducing apparatus 1 is operated by a shooting staff. The respective scenes constituting a video program are then shot on the basis of the production-instruction information of the obtained configuration-table metadata.

The camera built-in type recording-and-reproducing apparatus 1 records image data and audio data obtained by taking a picture on the recording medium such as the removable medium 3. At this time, the camera built-in type recording-and-reproducing apparatus 1 records the data of video-contents as one clip as a whole on the recording medium 3 to control the data. Here, the video content data includes image data, audio data, and so on, which correspond to a clip (i.e., a unit representing one imaging-processing).

Furthermore, the camera built-in type recording-and-reproducing apparatus 1 may incorporate not only an original image data (i.e., image data obtained by taking a picture) but also low-resolution image data (hereinafter, also referred to as "low-res data") or the like in a clip. Then, such a clip may be recorded on the removable medium 3 to control the data. The original data is high-definition image data having a large amount of data, so that it can be used for a completed video program. On the other hand, the low-res data is image data corresponding to an image frame with a smaller number of pixels produced by, for example, thinning out some pixels of each frame from the original image data. The low-res data has a low image quality and a smaller amount of data, compared with those of the original image data. Thus, the low-res data can be mainly used in the rough-editing process or the like because of its reduced loads on the respective processes of transmission, reproduction, and so on. Besides, the low-res data can be used for a thumbnail image or the like.

A plurality of clips recorded on the removable medium 3 by the camera built-in type recording-and-reproducing apparatus 1 are controlled by both MediaProfile and a clip-information file. MediaProfile, which will be described later with reference to FIG. 5, collectively controls the plurality of clips. In contrast, the clip-information file, which will be described later with reference to FIG. 6, controls the data for each clip, where data includes image data, audio data, or the like, which constitute the clip.

In the camera built-in type recording-and-reproducing apparatus 1, the clip image data or the like recorded on the removable medium 3 is displayed on a predetermined display unit on the basis of MediaProfile or the clip-information file. The shooting staff then confirms whether a picture is taken in response to the production-instruction information. In addition, the camera built-in type recording-and-reproducing apparatus 1 also allows the shooting staff to continuously confirm a plurality of shot scenes. That is, the shot scenes are continuously confirmed by representing a plurality of clip image data or the like recorded on the removable medium 3 on the predetermined display unit or the like on the basis of MediaProfile or the clip-information file as if data recorded on a tape is continuously reproduced.

In addition, the clip may be not only a unit representing one imaging-processing. It may also be a unit representing a time period from the start to the end of taking a picture in the imaging-processing, a unit representing the length of any kind of data obtained by the imaging-processing, or a unit representing the amount of data of any kind of data obtained by the imaging-processing. Alternatively, the clip may represent the assembly of various kinds of data obtained by the imaging-processing.

A plurality of clips (such as image data and audio data) is recorded as a video-content on the removable medium 3 by the camera built-in type recording-and-reproducing apparatus 1. Then, the removable medium 3 is brought to, for example, the editing station or the field PC 2 and utilized therein. However, such transport of the removable medium 3 may require a certain amount of time. Thus, the camera built-in type recording-and-reproducing apparatus 1 may supply the image data to the planning terminal device 6, the field PC 2, or the editing terminal device 7 through the network 5. In this case, for shortening a transfer time (reducing a load for transfer processing), instead of the image data obtained by taking a picture, the camera built-in type recording-and-reproducing apparatus 1 may preferably supply the low-res data having a smaller amount of data corresponding to such data.

It should be noted that, the camera built-in type recording-and-reproducing apparatus 1 may carry out the transmission processing of low-res data in any timing or in parallel with the imaging-processing or collectively after completing the imaging-processing.

As described above, the low-res data is transmitted to the editing station before transportation of the removable medium 3. Thus, the editing station can carry out an editing task at a comparatively early stage (for example, simultaneously in parallel with the imaging-processing) even when the transported removable medium 3 is not arrived. Therefore, the efficiency of producing a video program can be raised. Furthermore, when the low-res data is transmitted through the network 5 as described above, the camera built-in type recording-and-reproducing apparatus 1 may record only the original image data and the original audio data on the removable medium 3 (the low-res data may not be recorded on the removable medium 3).

Furthermore, the recording medium, on which any video content can be recorded by the camera built-in type recording-and-reproducing apparatus 1, is not only limited to the exemplified recording medium 3 as described. The recording medium may be any of recording media as far as the FAT system capable of writing with PC or the like is applied thereon. The removable media include semiconductor memories, such as flush memories, and other recording media.

The field PC 2 includes, for example, a portable information processor, such as a notebook-type personal computer or PDA, and its peripheral equipment(s). The field PC 2 is connected to the camera built-in type recording-and-reproducing apparatus 1 through any kind of a wired-communication or a wireless-communication. For instance, it can share the configuration-table metadata and the video-content with the camera built-in type recording-and-reproducing apparatus 1.

The field PC 2 may obtain, for example, configuration-table metadata from the planning terminal device 6 through the network 5. Alternatively, the field PC 2 may obtain configuration-table metadata from the camera built-in type recording-and-reproducing apparatus 1 through the network 5. The field PC 2 displays the acquired configuration-table metadata on a predetermined display unit to allow the person in charge of the editing station to recognize the contents which should be researched and shot.

Furthermore, the field PC 2 generates information on video-shooting conditions. Here, the video-shooting information is the information about the conditions of research and video-shooting generated in response to an input by the user, the person in charge of the editing station. Subsequently, the generated information about the conditions of video-shooting is added to the relevant column in the configuration-table metadata. The information about the conditions of shooting may be text data or the like described from any of various stand points of every clip or every research location. Such information may be useful in the subsequent editing process. In this way, the field PC 2 writes the information about the conditions of video-shooting therein to edit the configuration-table metadata. In addition, the field PC 2 supplies the information about the conditions of video-shooting as metadata to the camera built-in type recording-and-reproducing apparatus 1. Subsequently, the metaphase is added to the image data and the audio data obtained in the camera built-in type recording-and-reproducing apparatus 1.

The editing terminal device 7 includes, for example, an information processor, such as a personal computer, and its peripheral equipment(s). The editing terminal device 7 is installed in an editing station where a video content is subjected to the editing process. Here, the configuration-table metadata or the like reflects the production instruction or the scenario in the planning and organization station or the research situation in the editing station. Based on such metadata or the like, the editing station can edit the image data and the audio data obtained by the camera built-in type recording-and-reproducing apparatus 1 to complete a video problem.

The editing terminal device 7 obtains, for example, configuration-table metadata and low-res data from the camera built-in type recording-and-reproducing apparatus 1 through the network 5. Furthermore, the editing terminal device 7 obtains the original image data and the original data from the removable medium 3. On the removable medium 3, the clip (including image data and audio data) is recorded by the camera built-in type recording-and-reproducing apparatus 1. Furthermore, the editing terminal device 7 may also obtain direct-production instruction (instruction about the editing) from the planning terminal device 6, the field PC 2, or the like through the network 5.

The editing terminal device 7 reproduces and displays the acquired video-content in a preferable manner based on the configuration-table metadata obtained as described above. For instance, the editing terminal device 7 is operated by the user to sequentially display the data. In other words, the low-res data obtained through the network 5 or the original image data and the original audio data recorded on the removable medium 3 may be displayed in the order according the scenario. The original image data and the original audio data of all clips recorded on the removable medium 3 may be sequentially displayed. Alternatively, the image data in the desired clip may be only displayed. In addition, when the original image data recorded on the removable medium 3 is reproduced, the editing terminal device 7 reads out the data recorded on the removable medium 3 using a disk device or the like. Alternatively, the editing terminal device 7 may write the data on the removable medium 3. Furthermore, on this occasion, MediaProfile or a clip-information file for controlling the data recorded on the removable medium 3 is referenced.

Furthermore, for example, the editing terminal device 7 does not only reproduce and display the necessary image data or the like based on the configuration-table metadata in a preferable order. The device 7 may also carry out the process of editing the image data or the like obtained by research. For the editing process, there are a rough-editing process and an actual editing process.

The rough-editing process represents a simplified editing process on image data and audio data. For instance, in the rough-editing process, the editing terminal device 7 carries out the selection of a clip to be used in the actual editing among a plurality of clips when these clips are acquired. Then, a necessary video unit is chosen from the data in the selected clip (Logging). Subsequently, for example, an editing-start position (In point) and an editing-end position (Out point) corresponding to the chosen video part are set using time codes or the like, respectively. The corresponding unit is then extracted from the aforementioned clip data (Ingesting).

The actual editing process is responsible for connecting a plurality of image data. Here, the data constitutes each of the clips treated with the rough-editing process. A final image adjustment or the like is carried out on the resulting image data to prepare a complete package data to be broadcast in a program or the like.

Furthermore, the editing terminal device 7 is also capable of recording the image data and the audio data as one clip as a whole on the removable medium 3 in a manner similar to the camera built-in type recording-and-reproducing apparatus 1. Here, the image data and the audio data are obtained, for example, through the network 5 or from another recording medium.

Furthermore, a plurality of the planning terminal device 6, the camera built-in type recording-and-reproducing apparatus 1, the field PC 2, the editing terminal device 7, and so on may be provided respectively. For instance, image data or the like obtained by more than one camera built-in type recording-and-reproducing apparatus 1 may be acquired by one editing terminal device 7 from the removable medium 3 or through the network 5. The data may be then subjected to the editing process. Alternatively, more than one editing terminal device 7 may edit the data supplied from one camera built-in type recording-and-reproducing apparatus 1.

In the above description, functional components are, for example, the planning terminal device 6, the camera built-in type recording-and-reproducing apparatus 1, the field PC 2, and the editing terminal device 7. These functional components have been described as, but not limited to, those independent from one another. Alternatively, the functions of the respective components may be partially or wholly combined with one another.

Furthermore, for example, the video-program production supporting system 8 may be provided with a center server (not shown) connected to the network 5. The center server is independent from the planning terminal device 6, the camera built-in type recording-and-reproducing apparatus 1, the field PC 2, and the editing terminal device 7. Thus, the system may be configured as a Client/Server system where the planning terminal device 6, the camera built-in type recording-and-reproducing apparatus 1, the field PC 2, the editing terminal device 7, and so on are provided as the respective clients.

Figure 2:
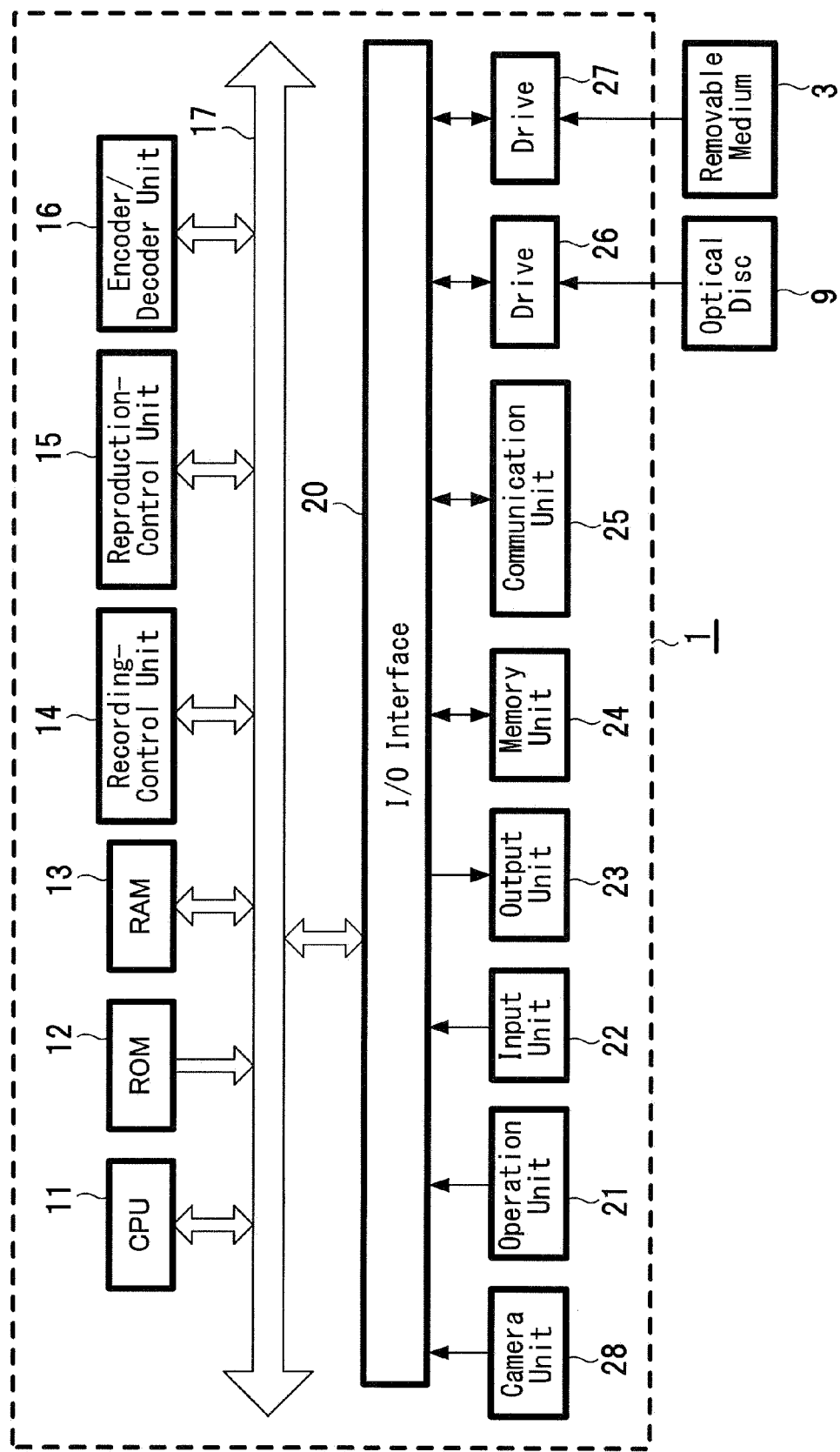
FIG. 2 is a block diagram that represents a configuration example of a camera built-in type recording-and-reproducing apparatus shown in FIG. 1.

FIG. 2 illustrates in detail an example of the configuration of the camera built-in type recording-and-reproducing apparatus 1 shown in FIG. 1. In FIG. 2, a central processing device (CPU) 11 executes various processes based on programs stored in a read only memory (ROM) 12. In a random access memory (RAM) 13, data, programs, and so on, which will be required by the CPU 11 in executing various processes, are properly stored.

The recording-control unit 14 controls the recording of data on the removable medium 3 via a drive 27 according to a file system in the removable medium 3, which will be described later with reference to FIG. 5. The data includes image data, audio data, low-res data, or the like supplied from an encoder/decoder unit 16 or those stored in a memory unit 24.

A reproduction-control unit 15 controls the drive 27 according to the file system of the removable medium 3 and then reads out the image data, the audio date, the low-res data, or the like stored in the removable medium 3. Subsequently, the read-out data is supplied to the encoder/decoder unit 16.

The encoder/decoder unit 16 encodes the image data and the audio data input from a camera unit 28 or an input unit 22 using a predetermined codec and supplies the result to the memory unit 24 or recording-control unit 14. Furthermore, if necessary, the encoder/decoder unit 16 encodes the image data input from the input unit 22 based on, for example, the MPEG-4 format and then supplies it as low-res data to the memory unit 24 or the recording-control unit 14. In addition, the encoder/decoder unit 16 encodes the audio data input from the input unit 22 based on, for example, the ITU-TG. 711 A-Law format and then supplies it as low-res data to the memory unit 24 or the recording-control unit 14.

The encoder/decoder unit 16 outputs the image data, the audio data, or the low-res data supplied from the reproduction-control unit 15 to a monitor, a speaker, or the like that constitutes an output unit 23.

The CPU 11, the ROM 12, the RAM 13, the recording-control unit 14, the reproduction-control unit 15, and the encoder/decoder unit 16 are connected to one another through a bus 17. In addition, an I/O interface 20 is also connected to the bus 17.

The I/O interface 20 is connected to an operation unit 21 constructed of a key board and a mouse. A signal input into the operation unit 21 is output to the CPU 11 through the I/O interface 20. In addition, the I/O interface 20 is connected to the camera unit 28, the input unit 22, the output unit 23, the memory unit 24, a communication unit 25, a drive 26, and the drive 27. Here, the camera unit 28 is provided for shooting the subject and inputting the shot image data. The input unit 22 includes a microphone or the like for inputting audio data. The output unit 23 includes a monitor, such as a cathode ray tube (CRT) or a liquid crystal display (LCD), and a speaker. The memory unit 24 includes a hard disk, an electronically erasable and programmable read only memory (EEPROM), or the like.

The communication unit 25 exchanges data with the editing terminal device 7 and so on. For instance, the communication unit 24 includes an IEEE (Institute of Electrical and Electronic Engineers) 1394 port, an USB (Universal Serial Bus) port, an NIC (Network Interface Card) for the LAN (Local Area Network) connection, an analog modem, a TA (Terminal Adaptor), a DSU (Digital Service Unit), an ADSL (Asymmetric Digital Subscriber Line) model, or the like. Thus, for example, the communication unit 25 may exchange data with the editing terminal device 7 or the like through the network 5, such as the Internet or the Intranet.

The drive 27 is designed to detachably connect with the removable medium 3. The drive 27 can record image data and audio data on the removable medium 3 or reproduce the image data and the audio data recorded thereon by actuating the removable medium 3 attached thereon.

The camera unit 28 includes an imaging device, such as a CCD (charge coupled device) or a CMOS (complementary metal oxide semiconductor), and coverts a subject's image entered through an optical system formed of various kinds of lenses into an electric signal (i.e., image data). The image data is then input into the encoder/decoder unit 16 through the I/O interface 20 and the bus 17 under the control of the CPU 11.

The removable medium 3 may be a flash-memory type recording medium referred to as Memory Stick® proposed and produced by the present applicant. The Memory Stick® is a small light-weight plate-shaped recording medium (e.g., dimensions of 21.5 mm in length, 50 mm in width, and 2.8 mm in thickness) and can be used in any of personal computers, digital cameras, portable digital audio players, and so on. The removable medium 3 may be one having a storage capacity of several tens to several hundreds gigabytes and the transfer rate thereof may be increased.

The image data, the audio data, and so on recorded on the removable medium 3 are controlled as clips (files) as a whole by a file system as described later with reference to FIG. 5. In this file system, a plurality of clips recorded on the removable medium 3 is controlled under MediaProfile and clip information. MediaProfile is a control file that controls all of the clips recorded on the removable medium 3 and contains metadata and information described on a clip information file. The clip information file is a control file for controlling later described essence data (which makes up the clip) every clip.

When the removable medium 3 is attached to the drive 27, MediaProfile is read out of the removable medium 3 and then expanded in the RAM 13. When the clip to be reproduced is indicated, the clip-information file is read out of the removable medium 3 and then expanded in the RAM 13. Hereinafter, the image data, the audio data, the low-res data, and so on, which constitute the clip, will be collectively referred to as "essence data" or "content data".

If required, the I/O interface 20 is further connected to the drive 26. The drive 26 is used when data is read out of or written on an optical disc 9.

The optical disc 9 may be, for example, one capable of recording large-volume data (e.g., 27 GB) at a minimum mark length of 0.14 μm and a recording density of 0.32 μm track-pitch using a purple-blue color laser with a numerical-aperture (NA) of 0.85 at a wavelength of 405 nm. In addition, instead of such an optical disc 9, any of other recording media may be used. For example, the media include other kinds of optical discs, such as DVD-RAM (Digital Versatile Disc-Random Access Memory), DVD-R (DVD-Recordable), DVD-RW (DVD-ReWritable), DVD+R (DVD+Recordable), DVD+RW (DVD+ReWritable), CD-R (Compact Disc-Recordable), and CD-RW (CD-ReWritable).

Furthermore, in the present embodiment, the optical disc 9 has been provided as an example of the recording medium where data is read and written by the driver 26. However, the medium is not limited to the optical disc 9. Any disk-shaped other recording media, such as a magnetic disk and a magneto-optical disk, can be applied.

Figure 3:
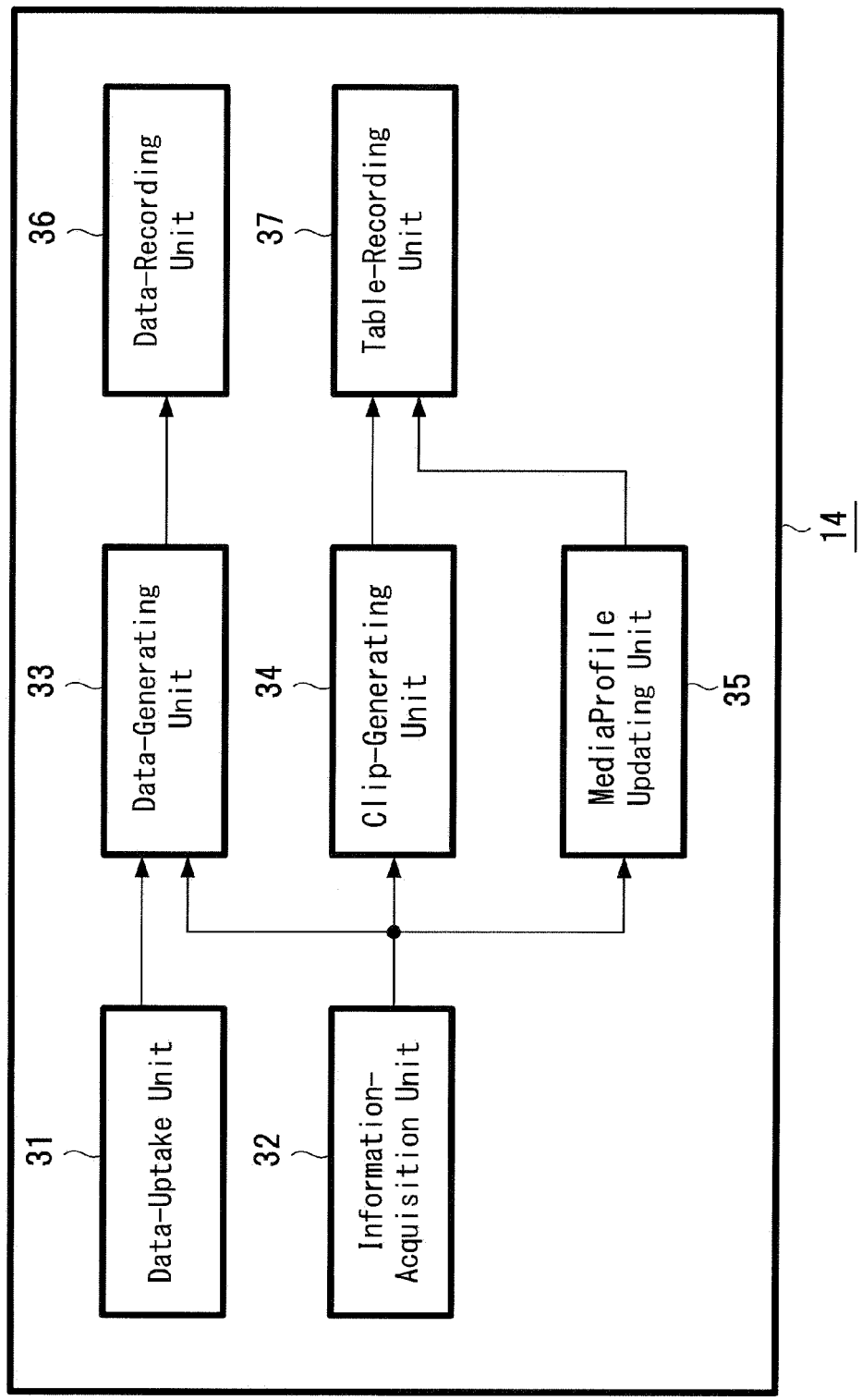
FIG. 3 is a block diagram that represents a configuration example of a recording-control unit shown in FIG. 2.

FIG. 3 illustrates an example of the configuration of the recording-control unit 14 shown in FIG. 2. In the example shown in FIG. 3, the recording-control unit 14 includes a data-uptake unit 31, an information-acquisition unit 32, a data-generating unit 33, a clip-generating unit 34, a MediaProfile updating unit 35, a data-recording unit 36, and a table-recording unit 37.

The data-uptake unit 31 uptakes the image data, the audio data, the low-res data, and so on from the encoder/decoder unit 16 or the memory unit 24 and then supplies them to the data-generating unit 33.

In addition, parameter information is stored in the RAM 13. Thus, when the information-acquisition unit 32 is instructed by the CPU 11 to initiate the data recording, the information-acquisition unit 32 obtains the parameter information from the RAM 13 and then supplies such information to the data-generating unit 33, the clip-generating unit 34, and the MediaProfile generating unit 35. The parameter information is the setting information of the camera built-in type recording-and-reproducing apparatus 1 for allowing the input unit 22 to input (shooting and recording) the image data and the audio data. In addition, the parameter information is reproduction information. Such information includes the information of resolutions of input image data and input audio data and the type of codec (coding method). In other words, the reproduction information can be required when the image data and the audio data are reproduced. The parameter information is previously set in the camera built-in type recording-and-reproducing apparatus 1 or set by the shooting staff or the like through the operation unit 21 and then stored in the RAM 13.

The data-generating unit 33 generates the respective essence data (the image data, the audio data, and the low-res data) in a predetermined format (e.g., MP4 in FIG. 6). In other words, the essence data is generated from the image data, the audio data, and the low-res data supplied from the data-uptake unit 31 based on the parameter information from the information-acquisition unit 32. Subsequently, the generated essence data is output to the data recording unit 36. In addition, the data-generating unit 33 generates metadata and so on in a predetermined formant, respectively, on the basis of the parameter information from the information-acquisition unit 33, followed by outputting to the data-recording unit 36.

Furthermore, the above essence data may be any of various other files, such as a MP4 file. The MP4 file is one of the file formats. In this file, a compressed motion picture, which is in the format of MPEG (moving picture experts group)-4, is stored and defined by Part 14 of the ISO/IEC 14496 standard. The motion pictures in the MPEG-2 and MPEG-1 formats may be also stored in addition to the motion picture in the MPEG-4 format. In addition, a sound in AAC (advanced audio coding) format, the MP-3 format, or the like; a still picture in JPEG (joint photographic experts group) format, PNG (portable network graphic) format; and so on can be multiplexed and stored. Thus, the format of data therein may not be recognized until the inside of the file is analyzed.

The clip-generating unit 34 generates a take directory when the parameter information is supplied from the information-acquisition unit 32 to generate a new task made up of collected clips for input data. In addition, on the basis of the parameter information from the information-acquisition unit 32, the clip-generating unit 34 generates a clip-information file on which the attribute information of the respective essence data is described. Such attribute information may be required for the reproduction of the respective essence data generated from the data-generating unit 33. Subsequently, the clip-generating unit 34 outputs the generated clip-information file to the table-recording unit 37.

The MediaProfile updating unit 35 generates clip elements to MediaProfile on the basis of the parameter information from the information-acquisition unit 32, thereby updating MediaProfile. In this case the clip elements correspond to the generated clip, while MediaProfile is read out of the removable medium 3 and expanded in the RAM 13. In each of the clip elements, the attribute information of the clip required for the clip reproduction is described. The MediaProfile updating unit 35 outputs the updated MediaProfile to a table memory unit 37.

The data-recording unit 36 records the data generated from the data-generating unit 33 on the removable medium 3 through the drive 27. The table-recording unit 37 records the clip directory, the clip-information file, and so on generated by the clip-generating unit 34 and MediaProfile updated by the MediaProfile updating unit 35 on the removable medium 3 through the drive 27.

Figure 4:
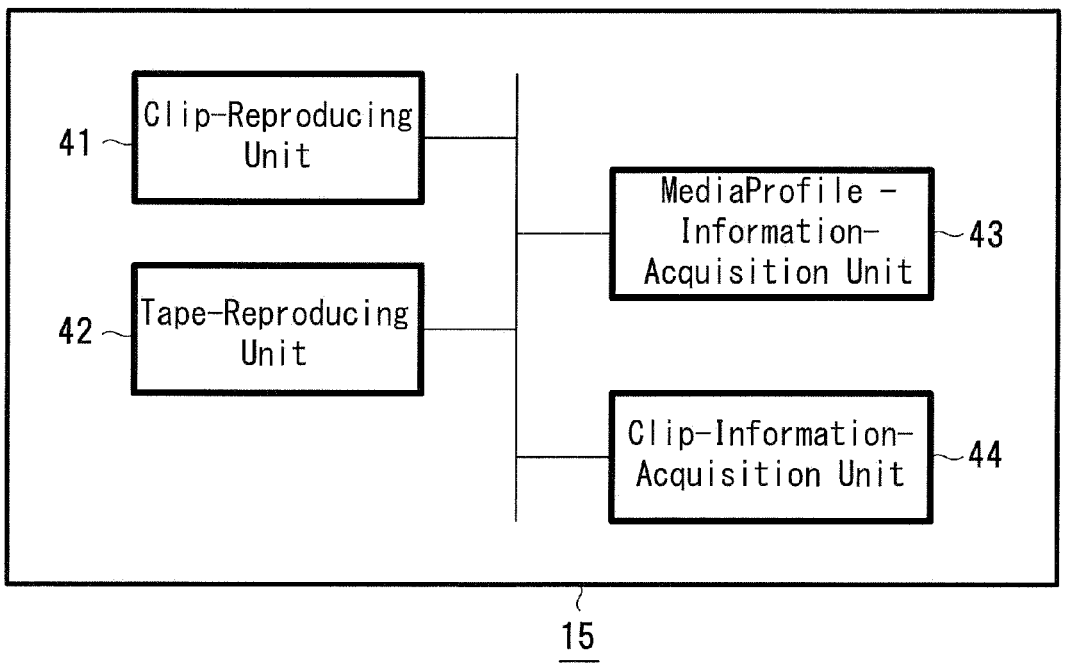
FIG. 4 is a block diagram that represents a configuration example of a reproduction-control unit of FIG. 2.

FIG. 4 illustrates an example of the configuration of the reproduction-control unit 15 shown in FIG. 2. In the example shown in FIG. 4, the reproduction-control unit 15 includes a clip-reproducing unit 41, a tape-reproducing unit 42, a MediaProfile-information-acquisition unit 43, and a clip-information-acquisition unit 44. The clip-reproducing unit 41 and the tape-reproducing unit 42 of the reproduction-control unit 15 control the MediaProfile-information-acquisition unit 43 or the clip-information-acquisition unit 44 to read out data from the removable medium 3. Such a control operation is carried out based on the instruction of starting the clip reproduction or starting the tape reproduction from the CPU 11.

In contrast to the clip reproduction in which one clip is reproduced, the tape reproduction is a successive clip-reproduction process in which all clips recorded on the removable medium 3 are continuously reproduced one by one in the order of being recorded as if the tape is reproduced.

The clip-reproducing unit 41 receives the instruction of starting the clip-reproduction from the CPU 11. When received, the clip-reproducing unit 41 controls the MediaProfile-information-acquisition unit 43 or the clip-information-acquisition unit 44 to obtain the information about reproduction of a clip. The driver 27 is then controlled based on the obtained information to read out the image data, the audio data, the low-res data, or the like recorded on the removable medium 3. The image data, the audio data, the low-res data, or the like read out of the removable medium 3 is then supplied to the encoder/decoder unit 16.

The tape-reproducing unit 42 receives the instruction of starting the tape-reproduction from the CPU 11. When received, the tape-reproducing unit 42 controls the MediaProfile-information-acquisition unit 43 or the clip-information-acquisition unit 44 to obtain the information about reproduction of the corresponding clip. The driver 27 is then controlled according to the obtained information to read out the image data, the audio data, the low-res data, or the like recorded on the removable medium 3. The image data, the audio data, the low-res data, or the like read out of the removable medium 3 is then supplied to the encoder/decoder unit 16. In other words, the tape reproduction unit 42 reads out and outputs the clips in the order being registered in MediaProfiles obtained from the MediaProfile information-acquisition unit 43.

The MediaProfile-information-acquisition unit 43 obtains the information about the reproduction of the corresponding clip from MediaProfile of the RAM 13 under the control of the clip-reproducing unit 41 or the tape-reproducing unit 42. Subsequently, the MediaProfile-information-acquisition unit 43 outputs the obtained information to the clip-reproducing unit 41 or the tape-reproducing unit 42.

The clip-information-acquisition unit 44 reads out the clip-information file of the corresponding clip from the removable medium 3 through the drive 27 and then expands it in the RAM 13 under the control of the clip-reproducing unit 41 or the tape-reproducing unit 42. In addition, the clip-information-acquisition unit 44 obtains the information for reproducing the corresponding clip from the clip information file of the RAM 13. The clip-information-acquisition unit 44 then outputs the information to the clip-reproducing unit 41 or the tape-reproducing unit 42.

Next, the file system for controlling the data recorded on the removable medium 3 and directory structure and the files in the file system will be described. In this file system, the data recorded on the removable medium 3 can be controlled by the directory structure and the files as shown in FIG. 5.

Figure 5:
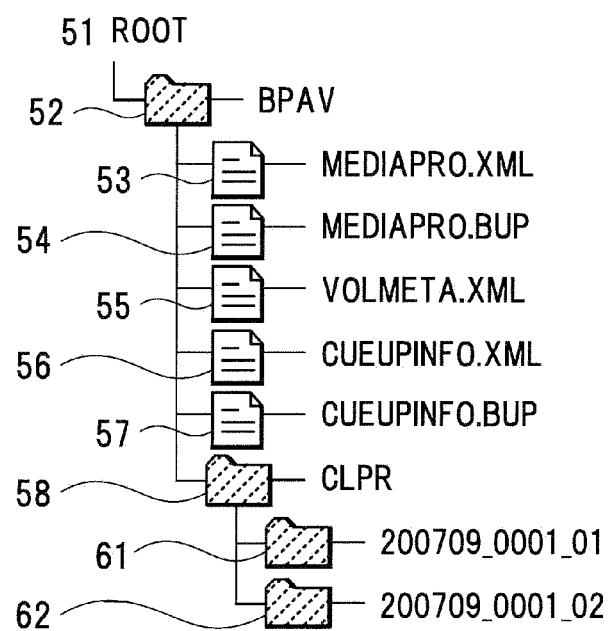
FIG. 5 is a diagram that represents a configuration example of a file system of a removable medium shown in FIG. 1.

FIG. 5 illustrates an example of the configuration of the file system of the removable medium 3. In FIG. 5, a root directory (ROOT) 51 is provided with a BPAV directory 52. In the subordinate directories of the BRAV directory 52, information about essence data including image data, audio data, and so on is placed, respectively. Furthermore, the root directory 51 is also provided with configuration-table data and so on (not shown).

The BPAV directory 52 is provided with a volume metafile (VOLMETA.XML) 55, MediaProfile (MEDIAPRO.XML) 53, and MediaProfile (MEDIAPRO.BUP) 54. The volume metafile (VOLMETA.XML) 55 is a file that contains information. The information may be of, for example, the title of or comments on all essence data recorded in the removable medium 3. In addition, the information may be of, for example, the pass of image data corresponding to the representative image as the representative frame of all image data recorded in the removable medium 3. The MediaProfile (MEDIAPRO.XML) 53 may contain, for example, control information for controlling all clips recorded on the removable medium 3. The MediaProfile (MEDIAPRO.BUP) 54 may be a copy of the MediaProfile 53. The preparation of two files may increase reliability.

The BPAV directory 52 is further provided with a cue-up information file (CUEUPINFO.XML) 56 and a cue-up information file (CUEUPINFO.BUP) 57. Each of the files is metadata for the whole data recorded on the removable medium 3 and may be, for example, a file containing information, such as a medium attribute, a reproduction-starting position, or Reclnhi. Furthermore, the cue-up information file 57 is a copy of the cue-up information file 56. Preparation of two files may increase reliability. However, when the information is updated, the cue-up information file 56 may be only updated.

Furthermore, in addition to the aforementioned files, the BPAV directory 52 is further provided with a clip root directory (CLPR) 58 where clip data are placed in subordinate directories.

In the clip root directory (CLPR) 58, the clip data recorded on the removable medium 3 is divided every clip to be controlled in different directories. For instance, in the case of FIG. 5, the data of two clips are divided into two directories; a clip directory (200709_0001_01) 61 and a clip directory (200709_0001_02) 62, and controlled. In other words, each data of the first clip recorded on the removable medium 3 is controlled as a file in a subordinate directory of the clip directory 61. In addition, each data of the second clip recorded on the removable medium 3 is controlled as a file in a subordinate directory of the clip directory 62.

Furthermore, each clip directory contains rewrite-and-deletion-inhibit attribute information. The rewrite-and-deletion-inhibit attribute of each data is controlled as a subordinate directory of each clip directory. Besides, such attribute is controlled based on the rewrite-and-deletion-inhibit attribute information of the superordinate clip directory.

In the subordinate directory of the clip directory 61 provided on the aforementioned clip root directory 58, each data of the clip initially recorded on the removable medium 3 is provided as a file as shown in FIG. 6 and controlled.

FIG. 6 illustrates an example of the configuration of the clip directory 61 shown in FIG. 5. In the case of FIG. 6, the clip directory 61 includes the following files:

a clip-information file (200709_0001_01.SMI) 71, which is provided for controlling the clip;

an image data file (200709_0001_01.MP4) 72, which is the image data (including audio data) file of the clip;

a clip metadata file (200709_0001_01.XML) 82, which contains clip metadata; here, the clip metadata is one on which any real-time property is not demanded and is provided for, for example, a conversion table for making a correlation between LTC (linear time code) and the frame number, corresponding to essence data of this clip;

a frame metadata file (200709_0001_01.BIM) 83, which contains frame metadata; here, the frame metadata is one, such as LTC, on which any real-time property is demanded, including low-res data corresponding to the image data of the clip, corresponding to the essence data of the clip;

a picture pointer file (200709_0001_01.PPN) 84, on which the frame-structure of the image data file 72 is described; here, the frame structure includes, for example, the information about the frame structure of the image data file 72 (e.g., information about compression format of each picture in the MPEG format or the like and the information about offset addresses or the like from the first of files); and the like. It should be noted that, as described above, the rewrite-and-deletion-inhibit attributes of these files are controlled based on the rewrite-and-deletion-inhibit attribute information contained in the clip directory 61.

In the case of FIG. 6, the image data, the low-res data, and the frame metadata, on which real-time properties can be demanded at the time of reproduction, are collectively controlled as a single file to prevent an increase in read-out time.

Similarly, the image data, the low-res data, and the frame metadata may be also controlled as two or more files depending on circumstances, respectively.

In FIG. 6, furthermore, the clip metadata, on which any real-time property is demanded, is controlled as a file different from the frame metadata on which the real-time property is demanded. This is because non-desired metadata is prevented from reading out during the usual reproduction of the image data or the like. Consequently, a reduction in time of reproduction process and a reduction in load required for the process can be attained.

Here, the clip metadata file 73 is described in XML (extensible markup language) format to give general versatility. The frame metadata file 74 is a BIM-formant file obtained by compiling an XML-formant file to reduce the processing time of the reproduction process and the load required for the process.

The exemplified file configuration of the clip directory 61 shown in FIG. 6 can be also applied to all of clip directories corresponding to the respective clips recorded on the removable medium 3. In other words, the exemplified file configuration shown in FIG. 6 can be applied to another clip directory 62 shown in FIG. 5. Thus, the description thereof will be omitted.

In the above description, an example applied to been described. However, the configuration of the file is not restricted by the examples as described above. As far as any clip metadata file corresponding to the clip is present in the subordinate directory of each clip directory, the film may have any configuration.

In the aforementioned example, the image data, the audio data, the low-res data, and so on in the MP4 formant (i.e., file formant for storing a compressed motion picture in the MPEG format) have been exemplified, but not limited thereto. The aforementioned example may be applied to image data, audio data, low-res data, and so on in any of other file formants, such the MXF (material exchange format)-file format.

Next, MediaProfile of the file system in the removable medium 3 will be described. As described above, MediaProfile includes ClipTable on which information for collectively controlling all clips recorded on the removable disk 3 is described. ClipTable further contains control information of essence data (e.g., image data, audio data, and low-res data). In addition, MediaProfile is a file to be mainly used in the removable medium 3 for controlling data therein and controlled in the XML formant with its own schema.

FIG. 7 illustrates an example of the MediaProfile 53 shown in FIG. 5. Here, in FIG. 7, the numeral on each head line and the colon mark (:) are only provided for convenient description, but not part of codes.

In <?xml version="1.0" encoding="UTF-8"?> in the first line represents, the MediaProfile 53 is described in the XML formant (version "1.0") in the second and subsequent lines and is encoded in UTF-8. In the example of FIG. 7, from the second line to the forth line (<MediaProfile xmlns="http://xmlns.sony.net/pro/metadata/MediaProfile" createdAt="2006-12-01T14:43:30+09:00"version="1.00">, the followings are represented: the most significant element <MediaProfile xmlns=" . . . > and the attributes of the most significant element "createdAt=" and "version=". "createdAt=" shows the created date and time of the MediaProfile 53. In addition, "version=" shows a schema version of the MediaProfile 53. The first to fourth lines as described above represents the attributes of the camera built-in type recordingand-reproducing apparatus 1 forming the MediaProfile 53 of the removable element 3 attached thereto.

The element <Contents> on lines 5 to 24 is one representing the list of materials (clips) of the removable medium 3 attached to the camera built-in type recording-and-reproducing apparatus 1. In addition, on lines 6 to 20, information corresponding to the clip directory (200709_0001_01) 61 is described. On lines 21 to 23, information corresponding to a clip directory (200709_0001_02) 62 is described. If there is no material, the element is not generated.

Elements in <Material> on lines 6 to 9 are sub-elements of the element <Contents>, all of which are essential descriptive elements except of videoType, audioType, and aspectRatio attributes. In this example, MPEG-2 is employed as a file formant of the image data.

The element <Material uri> on line 6 indicates the location of the corresponding clip (200709_0001_01.SMI) on the directory hierarchy. The <umid> attribute on line 9 represents a sole identifier in the worldwide set to the clip (200709_0001_01.SMI). The element <Component uri> on line 10 is one that describes essence data (200709_0001_01.MP4) corresponding to the element <Material uri>. The element <RelevantInfo uri> on lines 14 to 16 is one relating to the clip (200709_0001_01.SMI) and represents non-real time metadata, real-time meta data, and a picture pointer.

On lines 21 to 23, there is the information corresponding to the clip directory (200709_0001_02) 62 with the same configuration as that of the above clip directory (200709_0001_01) 61. Thus, the detailed explanation of the former will be omitted here as the foregoing explanation of the latter can be applied.

As mentioned above, the information required for the reproduction of essence data constituting the clip is described on MediaProfile. Such information may be, for example, information indicating the location of the essence data on the directory hierarchy and the accompanying information to the essence data. Therefore, the essence data in the clip can be read out and the accompanying information to the essence data, which is required for the reproduction of such data, is immediately obtained by referring to MediaProfile even without interpreting the information required for the reproduction.

Furthermore, MediaProfile uses universal SMIL and the clip-constituting essence data is then under the control of universal SMIL. Thus, MediaProfile can be easily used in an external device.

Figure 8:
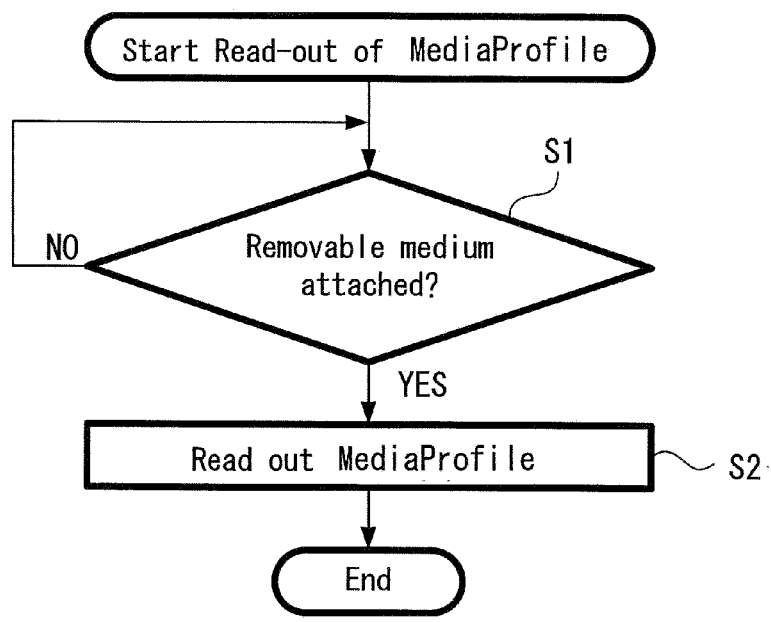
FIG. 8 is a flow chart that shows the process of reading out MediaProfile in a camera built-in type recording-and-reproducing apparatus shown in FIG. 1.

Subsequently, with reference to the flowchart in FIG. 8, the read-out MediaProfile process carried out when the removable medium 3 is attached to (mounted to) the camera built-in type recording-and-reproducing apparatus 1 will be described.

The shooting staff mounts the removable medium 3 on the drive 27 for recording image data and audio data obtained by shooting with the camera built-in type recording-and-reproducing apparatus 1. Alternatively, the removable medium 3 is mounted on the drive 27 for reproducing the contents, such as image data, audio data, and low-res data, recorded on the removable medium 3.

The CPU 11 performs the process of determining whether the removable medium 3 is mounted on the drive 27 (Step S1). If the removable medium 3 is not mounted on the drive 27, then the CPU 11 is kept in the suspended state until the mount. If the CPU 11 detects the mount of the removable medium 3 on the drive 27, then the CPU 11 informs and instructs the reproduction-control unit 15 to carry out the reproduction. The reproduction-control unit 15 controls the drive 27 to read out MediaProfile (e.g., MediaProfile 53) (Step S2) and then expanded (loaded) in the RAM 13, thereby terminating the read of MediaProfile.

In this way, the camera built-in type recording-and-reproducing apparatus 1 reads out MediaProfile from the removable medium 3 once the removable medium 3 is attached to the drive 27. MediaProfile is then expanded in the RAM 13. In the subsequent process, the writing and reading of data can be carried out on the removable medium 3 based on MediaProfile expanded in the RAM 13. Consequently, the data recorded on the removable medium 3 (i.e., contents, such as image data, audio data, and low-res data) can be accessed quickly.

As described above, the clip information on the removable medium 3 is copied on MediaProfile to allow the construction of a group of clips from the MediaProfile. MediaProfile is one of the data controlled by software on an operation memory (e.g., RAM 13) and provided as a list of clips present in the removable medium 3. The MediaProfile (MEDIAPRO.XML) 53 is one of management files in the removable medium 3, or a real-filed MediaProfile. MediaProfile can be obtained by reading it when the removable medium 3 is mounted on the camera built-in type recording-and-reproducing apparatus 1.

In the above description, the MediaProfile read-out process has been explained to be carried out when the removable medium 3 is mounted on the camera built-in type recording-and-reproducing apparatus 1. Alternatively, it may be carried out when the camera built-in type recording-and-reproducing apparatus 1, on which the removable medium 3 is being mounted, is powered on.

Here, when MediaProfile is considered to be defective because of any reason even though the MediaProfile is originally supposed to be a product of copying a real-file structure, there is a need of correction to fit to the real-file structure. Here, such a correction procedure (contents management) is referred to as "house-keeping". The house-keeping used herein and the functions thereof may have the following characteristic features: at first, MediaProfile can be updated under predetermined conditions; and secondary, the updated MediaProfile is written back to MediaProfile in the removable medium 3.

The house-keeping processing is carried out to make a removable medium operational when the removable medium uses a different format and cannot be used as it is. The house-keeping processing may be required under the following cases:

a first case is that any MediaProfile (MEDIAPRO.XML) 53 provided as a management file is not found in the removable medium 3; and a second case is that there is a difference between the contents of MediaProfile and the actual state of being recorded on the removable medium 3. In the second case, the contents of MediaProfile are obtained by reading out the MediaProfile (MEDIAPRO.XML) 53 being present as a management file in the movable medium 3 when the removable medium 3 is mounted on the camera built-in type recording-and-reproducing apparatus 1. The above second case may be, for example, the case in which the addition or deletion of the content file is carried out without reflecting on the MediaProfile (MEDIAPRO.XML) 53 by any apparatus other than camera built-in type recording-and-reproducing apparatus 1.

Here, the outline of the house-keeping processing will be described. When the existing MediaProfile is present, MediaProfile is compared with the BPAV directory structure and then updated under predetermined conditions. In the house-keeping process, the update is only performed on MediaProfile. Any of files, except of the MediaProfile (MEDI-APRO.XML) 53 placed below the BPAV directory 52 on the removable medium 3, may not be edited and deleted. In addition, any of files, except of the MediaProfile (MEDI-APRO.XML) 53, may not be newly prepared.

When MediaProfile is updated, it can be reflected to the MediaProfile (MEDIAPRO.XML) 53 at an appropriate timing as long as the removable medium 3 is in a writable state. In contrast, when the removable medium 3 is in an unwritable state, there is no need of updating the MediaProfile (MEDI-APRO.XML) 53 but keeping MediaProfile to date.

Figure 12:
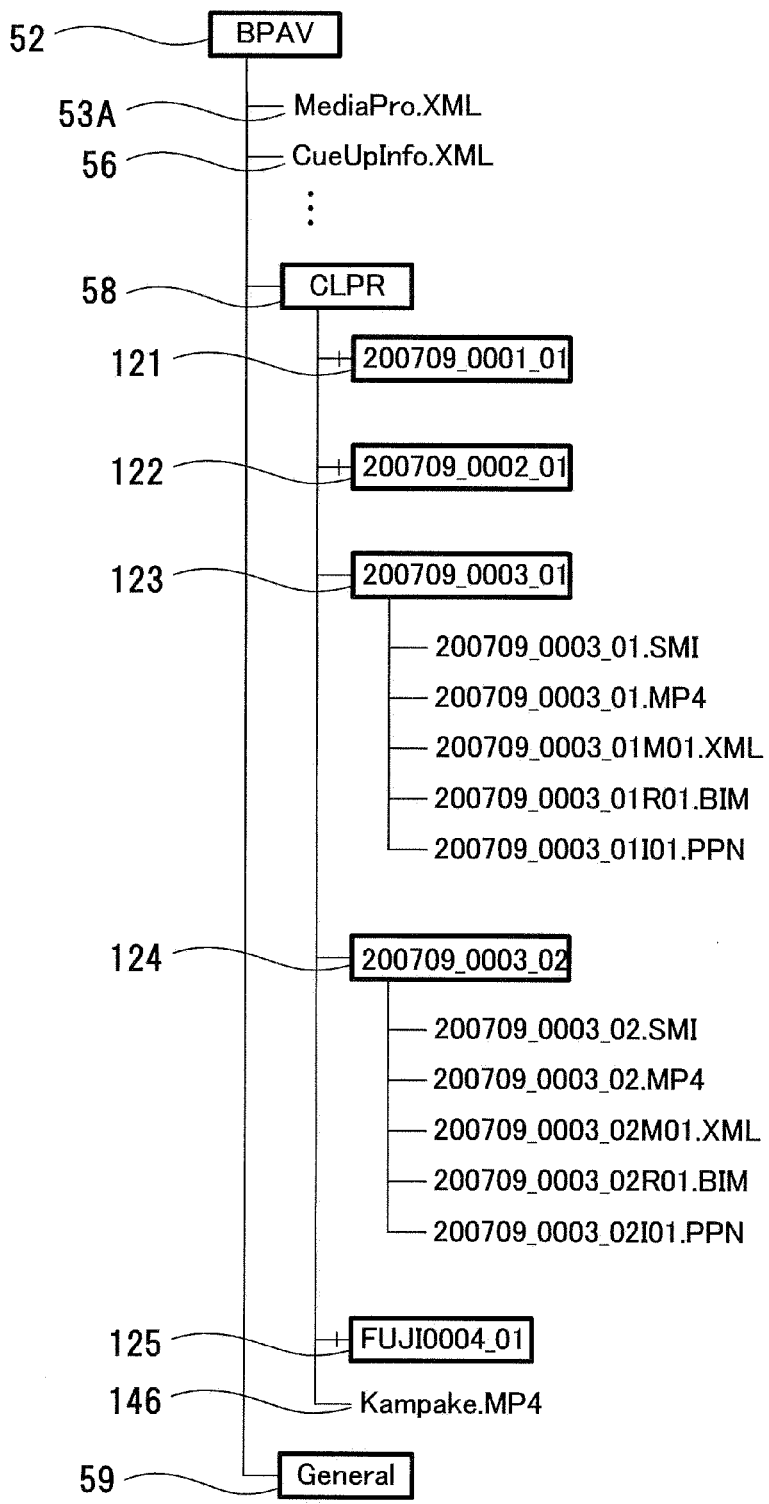
FIG. 12 is a diagram that represents a configuration example of a directory when a content file is added to the removable medium having the directory configuration of FIG. 10.

Next, the house-keeping processing will be described in detail with reference to the flowchart shown in FIG. 9. FIGS. 10 to 13 will be referenced for the aid of describing the flowchart of the house-keeping processing of FIG. 9. FIG. 10 illustrates an example of the directory configuration when a file is mounted based on the file system of the removable medium 3. FIG. 11 illustrates an example of MediaProfile corresponding to the directory configuration of FIG. 10. FIG. 12 illustrates an example of the directory configuration when a content file is added to the removable medium 3 of the directory configuration of FIG. 10. FIG. 13 illustrates an example of MediaProfile of the removable medium 3 added with the content file. Furthermore, in FIG. 10 and FIG. 12, any structural components corresponding to those in FIG. 5 are provided with the same symbols to omit the detailed descriptions thereof, respectively.

In FIG. 10, one prefixed with the plus sign (+) indicates the presence of a sub-element in the directory. The same will be also applied to FIG. 12 as described later. In FIG. 10, the BPAV directory 52 is formed directly under the root directory of the removable medium 3. In addition, directly under the BPAV directory 52, the MediaProfile (MEDIAPRO, XML) 53 and the cue-up information file (CUEUPINFO.XML) 56 are formed. The MediaProfile (MEDIAPRO, XML) 53 contains control information or the like for controlling all clips and an edit list recorded in the removable medium. The cue-up information file (CUEUPINFO. XML) 56 is a file that contains information of, for example, a medium attribute, a reproduction-starting position, or Reclnhi, which is a metadata for the whole data recorded on the removable medium 3.

As illustrated in FIG. 5, the BPAV directory 52 is provided with the volume metafile (VOLMETA.XML) 55, the MediaProfile (MEDIAPRO.BUP) 54, and the cue-up information file (CUEUPINFO.BUP) 57. The volume metafile (VOLMETA.XML) 55 is a file that contains information. The information may be of, for example, the pass of image data corresponding to the representative image as the representative frame of all image data recorded on the removable medium 3. Both the MediaProfile (MEDIAPRO.BUP) 54 and the cue-up information file (CUEUPINFO. BUP) 57 are provided for backup, respectively. The description of these files is herein omitted.

Furthermore, in addition to the aforementioned files, a clip root directory (CLPR) 58 and a general directory (General) 59 are further arranged in the subordinate directories of the BPAV directory 52. The clip root directory (CLPR) 58 contains essence data (content data), such as image data and audio data clip data. A general directory (General) 59 is provided for MediaProfile but not for clip. MediaProfile does not reflect the information of the general directory which is not clip information.

In the clip root directory (CLPR) 58, the clip data recorded on the removable medium 3 is divided every clip into different directories and controlled. For instance, in the case of FIG. 10, five directories are controlled. That is, the directories are a clip directory (200709_0001_01) 121, a clip directory (200709_0002_01) 122, a clip directory (200709_0003_01) 123, a clip directory (200709_0003_02) 124, and a clip directory (FUJI0004_01) 125.

For instance, the clip directory 123 contains the following files:

a clip information file (200709_0003_01.SMI) for controlling the clip;

a content data file (200709_0003_01.MP4), which is a file containing the image data or the like of the clip;

a clip metadata file (200709_0003_01M01.XML), which is metadata on which real-time property is not demanded, corresponding to the essence data of the clip;

a frame metadata file (200709_0003_01R01.BIN), which is metadata on which real-time property is demanded, corresponding to the essence data of the clip;

a picture pointer file (200709_0003_01I01.PPN), which is a file on which a frame structure of the image data file (e.g., information about a compression format for every picture in MPEG or the like and information about offset addresses or the like from the first of file); and the like.

In the example shown in FIG. 10, MP4 files are used as content data in the respective clip directories. The MP4 file can save both image data and audio data. However, instead of the MP4, any of other file formats, such as the MXF file format, may be used. In this case, for example, the image data and the audio data can be controlled as different files in one clip directory.

The configuration example of the clip index 123 shown in FIG. 10 can be applied to all of clip directories corresponding to the respective clips recorded in the removable medium 3. In other words, the file-configuration example of the clip index 123 can be applied even in other clip directories 121, 122, 124, and 125 as illustrated in FIG. 10, so that the description thereof will be omitted hereinafter.

The clip directory (FUJI0004_01) 125 is an example in which the name of the directory is changed from the voluntary serial number provided when the clip is generated in the camera built-in type recording-and-reproducing apparatus 1 to "FUJI0004_1" desired by the user.

FIG. 11 shows the list of materials of the MediaProfile (MEDIAPRO.XML) 53 as represented in FIG. 10. From lines 2 to 19 of the contents of the MediaProfile 53, locations of the files on the directory hierarchy are represented, as material items, respectively. Here, the files are subordinate to the clip root directory (CLPR) 58 shown in FIG. 10 and include: the clip directory (200709_0001_01) 121, the clip directory (200709_0002_01) 122, the clip directory (200709_0003_01) 123, and the clip directory (200709_0003_02) 124.

In addition, from lines 20 to 22, as material items, locations on the directory hierarchy of the files of the clip directory (FUJI0004_01), which is subordinate to the clip root directory (CLPR) 58 as shown in FIG. 10, are shown.

Here, the removable medium 3 having the directory configuration as shown in FIG. 10 is detached from the camera built-in type recording-and-reproducing apparatus 1 and then attached to any of the field PC 2, the planning terminal device 6, or the editing terminal device 7. Next, the case in which content data recorded on the removable medium 3 is edited using any of the above medium-mounting devices will be described. Here, the term "editing" means an operation accompanied by the addition or deletion of content data.

As a result of the above editing, the directory configuration of the file system in the removable medium 3 may be changed to one shown in FIG. 12 by an external apparatus other than the camera built-in type recording-and-reproducing apparatus 1. The directory configuration shown in FIG. 21 is formed such that that files of content data (Kampake.MP4) corresponding to the clip directly under the clip root directory (CLPR) 58 is added to the directory configuration shown in FIG. 10, while other structures are not changed. At this time, the MediaProfile (MEDIAPRO.XML) 53 of the removable medium 3 is not changed. In other words, the file information of the additional content data 146 is not reflected to the MediaProfile (MEDIAPRO.XML) 53.

When removable medium 3 added with the above additional content data 146 is returned to the camera built-in type recording-and-reproducing apparatus 1 and then mounted thereon again, the camera built-in type recording-and-reproducing apparatus 1 starts the reading of the MediaProfile (MEDIAPRO.XML) 53 as shown in FIG. 7. Subsequently, if it satisfies the predetermined conditions, then the housekeeping processing of FIG. 9 is carried out.

Here, the above description has explained that the housekeeping processing is carried out when the removable medium 3 is attached to (mounted on) the camera built-in type recording-and-reproducing apparatus 1. However, the housekeeping processing may be also carried out when the camera built-in type recording-and-reproducing apparatus 1, on which the removable medium 3 is being mounted, is powered on.

Figure 9:
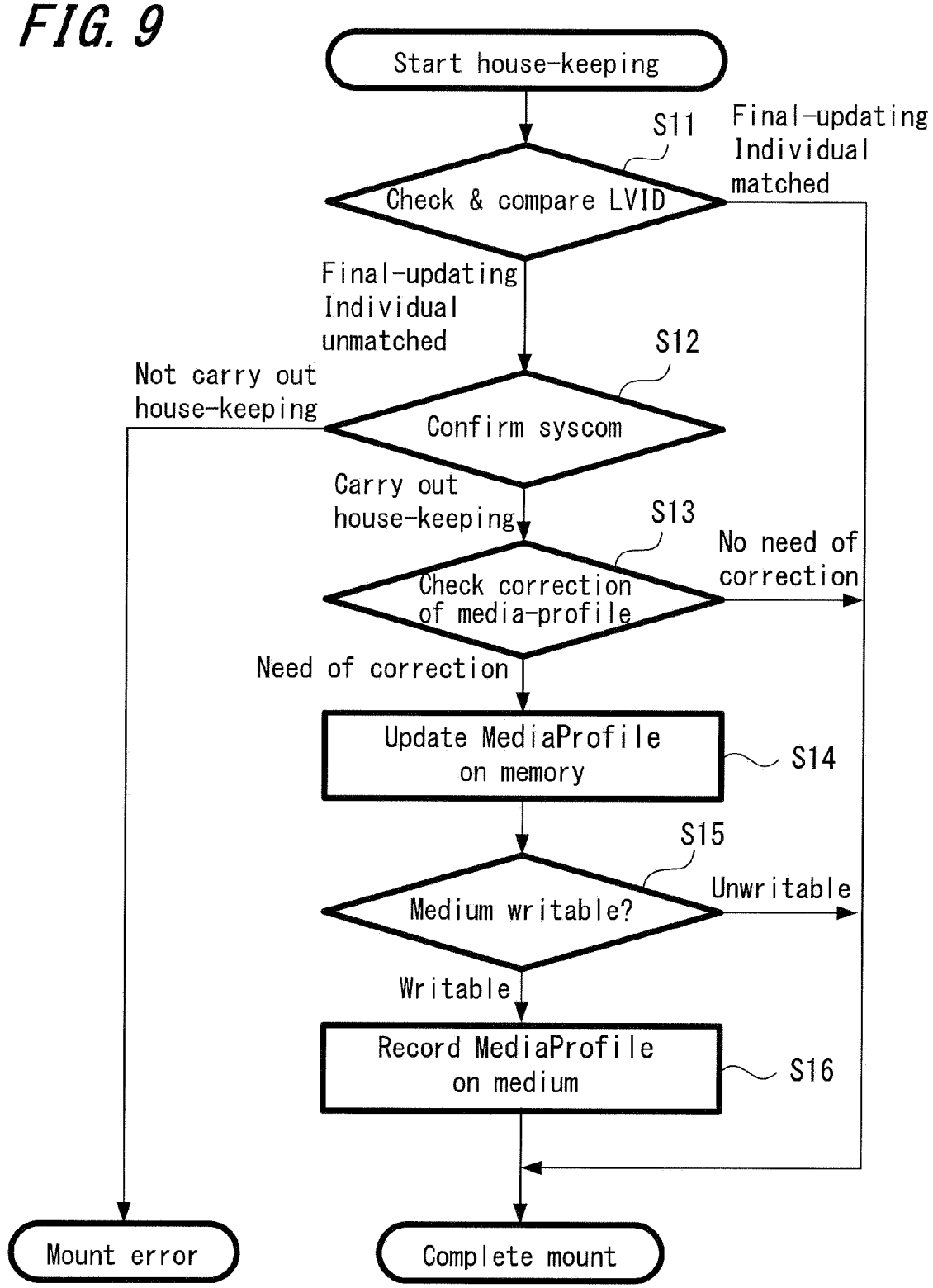
FIG. 9 is a flow chart that shows a house-keeping processing.
Figure 10:
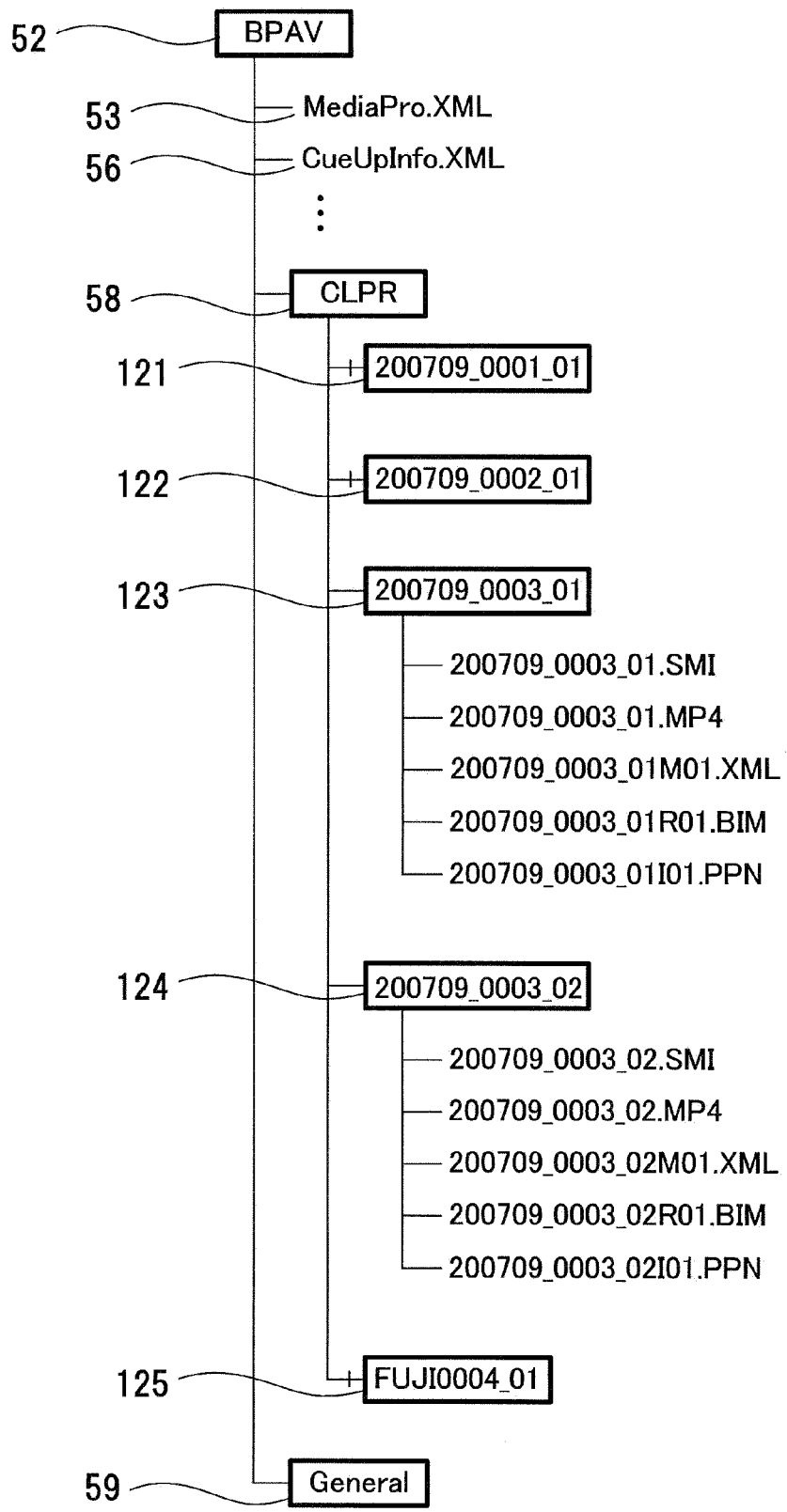
FIG. 10 is a diagram that represents a configuration example of a directory of a file recorded on a removable medium.

As shown in FIG. 9, at first, the reproduction-control unit 15 of the camera built-in type recording-and-reproducing apparatus 1 obtains information that specifies a device having the latest updated file system of the removable medium 3. In other words, the information about an individual in charge of the last altered information data (LVID) is obtained and then used in determination of whether the individual corresponds to that of the camera built-in type recording-and-reproducing apparatus 1.

When the individual in charge of the last varied information data (LVID) corresponds to the camera built-in type recording-and-reproducing apparatus 1, it means that the MediaProfile (MEDIAPRO.XML) 53 thereof is finally edited by the camera built-in type recording-and-reproducing apparatus 1. In this case, the content data is edited using the camera built-in type recording-and-reproducing apparatus 1 and the clip or MediaProfile is then modified through the predetermined processing. Therefore, no problem occurs with respect to the reproduction after the reattachment of the removable medium 3. In this case, therefore, a further specific processing is not carried out and the mount of the removable medium 3 is then completed.

Furthermore, in the reproduction-control unit 15, MediaProfile is already present. Thus, in addition to confirm the individual in charge of LVID, the reproduction-control unit 15 confirms that the contents being described as the clip in MediaProfile matches the clip name (the name of clip directory and single MP4 file name) (Step S11). When matched, no specific processing is carried out and the mount of the removable medium is the completed.

If none of the above conditions is satisfied, the reproduction-control unit 15 gives a system controller (syscom) (e.g., CPU 11) a notice that the house-keeping processing is required and then follows execution instruction from the CPU 11 (Step S12). If the house-keeping is not carried out, a medium-mount error occurs and the processing is then terminated in a state of dealing with the error. When the execution of house-keeping processing is instructed, then the process proceeds to the next step.

The reproduction-control unit 15 makes a comparison between MediaProfile (MEIAPRO.XML) 53 expanded in the RAM 13 and the designated group of files below the BPAV directory 52 in the removable medium 3 to determine whether the MediaProfile (MEDIAPRO.XML) 53 should be corrected or not (Step S13). If the requirements of the above comparison are not satisfied, the MediaProfile (MEDIAPRO.XML) 53 does not require any correction and the mount of the removable medium 3 is then completed. The contents of the comparison are as follows:

At first, if a content data file, which does not already described in the existing MediaProfile (MEDIAPRO.XML) 53, is present and the following requirements are all satisfied, then such a file is added as a clip to the MediaProfile (MEDIAPRO.XML) 53.

[1] MP4 file exists directly under the clip root directory (CLPR) 58, or one or more MP4 files exist under the clip directory.

[2] The MP4 file satisfies the requirements as a clip as described below. In other words, in this example, the MP4 added to the removable medium 3 satisfies the requirements specified on the item of Part 14 in the ISO/IEC 14496 standard. Furthermore, the MP4 file added by the external apparatus can be handled by the camera built-in type recording-and-reproducing apparatus 1.

Secondary, the content data file and the clip are previously described in the existing MediaProfile (MEDIAPRO.XML) 53 and the corresponding clip (content data) and the clip directory satisfy the following requirements, the description is deleted from the MediaProfile (MEDIAPRO.XML) 53.

[1] The MP4 file should be located directly below the clip root directory (CLPR) 58 but not found in the removable medium 3.

[2] No clip directory

In this case, as shown in FIG. 13, the MP4 file is present directly below the clip root directory (CLPR) 58 but no description is found in the existing MediaProfile (MEDIAPRO.XML) 53. Thus, it satisfies the above first requirement.

If it is determined that the MediaProfile (MEDIAPRO.XML) 53 should be corrected, the recording-control unit 14 updates the contents of the MediaProfile (MEDIAPRO.XML) 53 expanded in the RAM 13 (Step S14).

Furthermore, the recording-control unit 14 determines whether the recording medium 3 is in a rewritable state (Step S15). If it is determined that the recording medium 3 is in a rewritable state, then the contents of MediaProfile added with the above correction is written in the removable medium 3 based on the format defined by "MEDIAPRO.XML" (Step S16). Consequently, the mount-processing of the removable medium 3 is completed.

On the other hand, in the processing of Step S15, if the removable medium 3 is unwritable due to any reason, no writing is carried out in the removable medium 3. Consequently, the mount of the removable medium 3 is completed.

The MediaProfile (MEDIAPRO.XML) 53 of the removable medium 3 added with the content data 146 of FIG. 12 is corrected as described in FIG. 13 by the above house-keeping treatment. In the list of materials of MediaProfile as shown in FIG. 13, the location of each file of the clip (Campake.MP4) on the directory hierarchy directly below the clip-root directory (CLPR) 58 is represented on line 23 of the content column.

As described above, in the above embodiment, the compatibility of the file (content data) registered in MediaProfile (content management file) and the actual file is investigated. If any unregistered file is found, then the reproducibility thereof is investigated. If it is reproducible, then the file information is registered to the content management file (house-keeping processing). As constructed in this way, the contents of MediaProfile in the removable medium can be matched with the actual file configuration. Therefore, any file (content data) arbitrarily written in a memory medium using any apparatus, such as PC, other than the camera built-in type recording-and-reproducing apparatus, can be automatically recognized and reproduced as a content with respect to the reproducible file in the camera built-in type recording-and-reproducing apparatus. The removable medium having a possibility of different format and may not be used as it is, can be changed into a usable state.

In addition, the above comparison processing is not carried out when the information about an individual in charge of the last varied information data in the removable medium attached to the camera built-in type recording-and-reproducing apparatus corresponds to the camera built-in type recording-and-reproducing apparatus. If it is surely determined that there is no format difference, then no comparison is conducted between the file registered in MediaProfile and the actual file. Consequently, if there may be a possibility of format difference, house-keeping is conducted. Therefore, the range of targets to be subjected to the house-keeping processing can be narrowed, thereby avoiding needless processing.

Also, according to an embodiment of the present invention, the user writes content data on the removable medium using PC or the like. When the removable medium is then inserted into a slot of the camera built-in type recording-and-reproducing apparatus, the house-keeping function of the camera built-in type recording-and-reproducing apparatus is employed to investigate whether the content is reproducible. In this case, the house-keeping processing is performed on the content data placed directly in a subordinate specific folder or in the arbitrary subordinate folder below the specific folder. If it is determined that the content data is reproducible, then it is registered to MediaProfile (content management file) in the camera built-in type recording-and-reproducing apparatus, thereby being handled in the camera built-in type recording-and-reproducing apparatus. Consequently, a thumbnail display and reproduction can be obtainable.

It is not realistic for the camera built-in type recording-and-reproducing apparatus to cope with any case in which any folder and content data are arbitrarily formed and stored any position in a removable medium. For example, the processing load and response rate of the camera built-in type recording-and-reproducing apparatus should be considered. However, it becomes realistic by constructing as described above. That is, the content data arbitrarily written in the removable medium by the user with PC or the like can be automatically recognized and reproduced as a content as long as it is written in a predetermined location and reproducible in the camera built-in type recording-and-reproducing apparatus. As a result, the processing load decreases while increasing the response rate as locations to be searched are restricted.

In this way, according to an embodiment of the present invention, the user is allowed to write content data in a removable medium to be used as a recording medium in the camera built-in type recording-and-reproducing apparatus by PC or the like. Then, the removable medium is inserted into a slot of the camera built-in type recording-and-reproducing apparatus. On this occasion, the house-keeping function of the camera built-in type recording-and-reproducing apparatus investigates as follows: for the content data in an arbitrary folder that satisfies certain requirements, the reproduction of the content data is investigated. When the content data is determined to be reproducible, the content data is registered in the content management file (e.g., MediaProfile) of the camera built-in type recording-and-reproducing apparatus. Thus, the camera built-in type recording-and-reproducing apparatus is allowed to display a thumbnail, reproduces the information, and so on.

Furthermore, in the description of the house-keeping processing in the above embodiment, the file format of the additional content data has been exemplified as a MP4 file capable of combining image data with audio data. However, it is not limited to such a format. For example, only image data, only audio data, or only thumbnail-displaying data may be used.

It should be understood by those skilled in the art that various modifications, combinations, sub-combinations and alterations may occur depending on design requirements and other factors insofar as they are within the scope of the appended claims or the equivalents thereof.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A recording-and-reproducing apparatus for managing content data recorded on a removable recording medium, said apparatus comprising:

means for acquiring, when the content data is recorded, reproduction information required for reproducing the content data;

means for generating a first management file for individually managing the content data on which an identifier for uniquely identifying the content data, information about an individual in charge of last varied information data (LVID), and the reproduction information obtained by the information-acquisition means are described, the information about the individual in charge of the last varied information data being information that specifies a device having a latest updated file system of the removable medium;

means for registering control information for the content data including the reproduction information, the identifier of the content data contained in the first management file, the individual in charge of the last varied information data, and location information of the content data, in a second management file collectively managing the content data;

means for reading out the control information in the second management file recorded on the recording medium when the recording medium is detached from and again attached to the recording-and-reproducing apparatus or when the recording-and-reproducing apparatus is powered on;

a memory in which the control information in the second management file read out by the read-out means is expanded;

means for determining whether the individual in charge of the last varied information data in the second management file expanded in the memory matches that of the recording-and-reproducing apparatus;

means for comparing the control information in the second management file expanded in the memory and the content data recorded on the recording medium in response to the individual in charge of the last varied information data in the second management file expanded in the memory not matching that of the recording-and-reproducing apparatus; and means for updating the control information in the second management file expanded in the memory in response to the control information in the second management file recorded on the recording medium not being coincident with the content data as a result of the comparison by the comparison means.

2. A method for managing content data recorded on a removable recording medium, said method comprising:

acquiring, when the content data is recorded, reproduction information required for reproducing the content data;

generating a first management file for individually managing the content data on which an identifier for uniquely identifying the content data, information about an individual in charge of last varied information data (LVID), and the reproduction information obtained by the acquiring step are described, the information about the individual in charge of the last varied information data being information that specifies a device having a latest updated file system of the removable medium;

registering control information for the content data including the reproduction information, the identifier of the content data contained in the first management file, the individual in charge of the last varied information data, and location information of the content data, in a second management file collectively managing the content data;

reading out the control information in the second management file recorded on the recording medium when the recording medium is detached from and again attached to the recording-and-reproducing apparatus or when the recording-and-reproducing apparatus is powered on;

using a memory in which the control information in the second management file read out by the reading-out step is expanded;

determining whether the individual in charge of the last varied information data in the second management file expanded in the memory matches that of the recording-and-reproducing apparatus;

comparing the control information in the second management file expanded in the memory and the content data recorded on the recording medium in response to the individual in charge of the last varied information data in the second management file expanded in the memory not matching that of the recording-and-reproducing apparatus; and updating the control information in the second management file expanded in the memory in response to the control information in the second management file recorded on the recording medium not being coincident with the content data as a result of the comparison by the comparing step.

3. A recording-and-reproducing apparatus for managing content data recorded on a removable recording medium, said apparatus comprising:

a device configured to acquire, when the content data is recorded, reproduction information required for reproducing the content data;

a device configured to generate a first management file for individually managing the content data on which an identifier for uniquely identifying the content data, information about an individual in charge of last varied information data (LVID), and the reproduction information obtained by the acquiring device are described, the information about the individual in charge of the last varied information data being information that specifies a device having a latest updated file system of the removable medium;

a device configured to register control information for the content data including the reproduction information, the identifier of the content data contained in the first management file, the individual in charge of the last varied information data, and location information of the content data, in a second management file collectively managing the content data;

a device configured to read out the control information in the second management file recorded on the recording medium when the recording medium is detached from and again attached to the recording-and-reproducing apparatus or when the recording-and-reproducing apparatus is powered on;

a memory in which the control information in the second management file read out by the reading-out device is expanded;

a device configured to determine whether the individual in charge of the last varied information data in the second management file expanded in the memory matches that of the recording-and-reproducing apparatus;

a device configured to compare the control information in the second management file expanded in the memory and the content data recorded on the recording medium in response to the individual in charge of the last varied information data in the second management file expanded in the memory not matching that of the recording-and-reproducing apparatus; and a device configured to update the control information in the second management file expanded in the memory in response to the control information in the second management file recorded on the recording medium not being coincident with the content data as a result of the comparison by the comparing device.

4. A recording-and-reproducing apparatus according to claim 1, wherein the recording-and-reproducing apparatus is a camera built-in type recording-and-reproducing apparatus, and the information about the individual in charge of the last varied information data in the removable medium corresponds to the camera built-in type recording-and-reproducing apparatus.

5. A recording-and-reproducing apparatus according to claim 1, wherein when information about the content data recorded on the recording medium is not described in the control information in the second management file expanded in the memory as a result of the comparison by the comparison means, the updating means describes the information of the content data on the control information in the second management file.

6. A recording-and-reproducing apparatus according to claim 1, wherein when information about content data, which is not present in the recording medium, is described in the control information in the second management file expanded in the memory as a result of the comparison by the comparison means, the updating means deletes the information about the content data from the control information in the second management file.

7. A recording-and-reproducing apparatus according to claim 1, wherein the comparison means compares content data and the control information in the second management file expanded in the memory, the content data being located directly below a directory having a content data directory as a subordinate layer and positioned on a subordinate layer of a route directory of a file system of the recording medium, or the content data being located below a content directory formed on a subordinate layer of the directory having the content data directory as a subordinate layer.

8. A recording-and-reproducing apparatus according to claim 1, further comprising: means for recording the control information in the updated second management file on the recording medium after updating the control information in the second management file.

9. A method for managing content data recorded on a removable recording medium according to claim 2, wherein when information about the content data recorded on the recording medium is not described in the control information in the second management file expanded in the memory as a result of the comparison by the comparing step, the updating step describes the information of the content data on the control information in the second management file.

10. A method for managing content data recorded on a removable recording medium according to claim 2, wherein when information about content data, which is not present in the recording medium, is described in the control information in the second management file expanded in the memory as a result of the comparison by the comparing step, the updating step deletes the information about the content data from the control information in the second management file.

11. A method for managing content data recorded on a removable recording medium according to claim 2, wherein the comparing step compares content data and the control information in the second management file expanded in the memory, the content data being located directly below a directory having a content data directory as a subordinate layer and positioned on a subordinate layer of a route directory of a file system of the recording medium, or the content data being located below a content directory formed on a subordinate layer of the directory having the content data directory as a subordinate layer.

12. A method for managing content data recorded on a removable recording medium according to claim 2, further comprising: recording the control information in the updated second management file on the recording medium after updating the control information in the second management file.

13. A recording-and-reproducing apparatus according to claim 3, wherein the recording-and-reproducing apparatus is a camera built-in type recording-and-reproducing apparatus, and the information about the individual in charge of the last varied information data in the removable medium corresponds to the camera built-in type recording-and-reproducing apparatus.

14. A recording-and-reproducing apparatus according to claim 3, wherein when information about the content data recorded on the recording medium is not described in the control information in the second management file expanded in the memory as a result of the comparison by the device configured to compare, the device configured to update describes the information of the content data on the control information in the second management file.

15. A recording-and-reproducing apparatus according to claim 3, wherein when information about content data, which is not present in the recording medium, is described in the control information in the second management file expanded in the memory as a result of the comparison by the device configured to compare, the device configured to update deletes the information about the content data from the control information in the second management file.

16. A recording-and-reproducing apparatus according to claim 3, wherein the device configured to compare compares content data and the control information in the second management file expanded in the memory, the content data being located directly below a directory having a content data directory as a subordinate layer and positioned on a subordinate layer of a route directory of a file system of the recording medium, or the content data being located below a content directory formed on a subordinate layer of the directory having the content data directory as a subordinate layer.

17. A recording-and-reproducing apparatus according to claim 3, further comprising: a device configured to record the control information in the updated second management file on the recording medium after updating the control information in the second management file.

* * * * *